United States Patent
Asaoka et al.

(10) Patent No.: US 10,275,457 B2
(45) Date of Patent: Apr. 30, 2019

(54) INFORMATION PROCESSING APPARATUS AND CONTROL METHOD FOR INFORMATION PROCESSING APPARATUS

(71) Applicant: FUJITSU LIMITED, Kawasaki-shi, Kanagawa (JP)

(72) Inventors: Masahiro Asaoka, Kawasaki (JP); Ken Yokoyama, Kawasaki (JP); Yukihiro Watanabe, Kawasaki (JP); Hiroshi Otsuka, Kawasaki (JP); Reiko Kondo, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/889,253

(22) Filed: Feb. 6, 2018

(65) Prior Publication Data

US 2018/0232360 A1    Aug. 16, 2018

(30) Foreign Application Priority Data

Feb. 13, 2017   (JP) .................................. 2017-024506

(51) Int. Cl.
*G06F 17/27* (2006.01)
*G10L 15/00* (2013.01)
(Continued)

(52) U.S. Cl.
CPC .......... *G06F 17/2785* (2013.01); *G06F 11/30* (2013.01); *G06F 16/345* (2019.01); *G06F 16/35* (2019.01)

(58) Field of Classification Search
CPC ........ G06F 11/30; G06F 16/345; G06F 16/35; G06F 17/2785
(Continued)

(56) References Cited

U.S. PATENT DOCUMENTS 8,762,375 B2 * 6/2014 Brdiczka ............. G06F 17/2715
                                                      707/736
9,906,476 B2 * 2/2018 Watanabe ............... H04L 51/12
(Continued)

FOREIGN PATENT DOCUMENTS

JP    2013-171471    9/2013
JP    2015-153078    8/2015
WO    2015/072085    5/2015

*Primary Examiner* — Khai N. Nguyen
(74) *Attorney, Agent, or Firm* — Fujitsu Patent Center

(57) ABSTRACT

A computer executes a process of: generating co-occurrence-message bunches by summarizing messages based on a relation in which the messages output from an apparatus are mutually output within a predetermined period; classifying the generated co-occurrence-message bunches into groups based on similarity among the co-occurrence-message bunches; determining a first message which is a representative of each of the groups based on an appearance characteristic of a word or a word string included in each message of each of the groups; determining a second message which is a representative of each of the co-occurrence-message bunches and is not repeated based on an appearance characteristic of a word or a word string included in each message in each co-occurrence-message bunch of each of the groups; and outputting the first message determined for the group including each co-occurrence-message bunch and the second message determined for each co-occurrence-message bunch in correlation with each co-occurrence-message bunch.

20 Claims, 19 Drawing Sheets

(51) Int. Cl.
    *G10L 15/04*       (2013.01)
    *G10L 15/18*       (2013.01)
    *G10L 13/00*       (2006.01)
    *G06F 11/30*       (2006.01)
    *G06F 16/34*       (2019.01)
    *G06F 16/35*       (2019.01)

(58) Field of Classification Search
    USPC .................................... 704/9, 251, 257.263
    See application file for complete search history.

(56) References Cited

U.S. PATENT DOCUMENTS

| | | | |
|---|---|---|---|
| 2011/0258193 A1* | 10/2011 | Brdiczka | G06F 17/2715 707/739 |
| 2014/0297261 A1* | 10/2014 | Sayers | G06F 17/2795 704/9 |
| 2015/0095021 A1* | 4/2015 | Spivack | G06F 17/275 704/9 |
| 2016/0314398 A1* | 10/2016 | Fei | G06F 17/2735 |
| 2018/0165173 A1* | 6/2018 | Lin | G06F 11/3476 |
| 2018/0232360 A1* | 8/2018 | Asaoka | G06F 11/30 |

\* cited by examiner

| M0001 | Server health check started. |
|---|---|
| M0002 | Created health check process. |
| M0003 | Health check process is running. |
| M0004 | Ping check .+ is successful. |
| M0005 | TCP port .+ check is successful. |
| M0006 | .+ process is running. |
| M0007 | .+ application check is successful. |
| M0008 | Server health check OK. |

102

| M0001 | Server health check started. |
|---|---|
| M0002 | Created health check process. |
| M0003 | Health check process is running. |
| M0009 | Ping check .+ is failed. |
| M0010 | TCP port .+ check is failed. |
| M0006 | .+ process is running. |
| M0007 | .+ application check is successful. |
| M0011 | Server health check NG. |

103

| M0001 | Server health check started. |
|---|---|
| M0002 | Created health check process. |
| M0003 | Health check process is running. |
| M0004 | Ping check .+ is successful. |
| M0005 | TCP port .+ check is successful. |
| M0012 | .+ process is stopped. |
| M0013 | .+ application check is failed. |
| M0011 | Server health check NG. |

110 / 111

| M0021 | proxy_connect_backend disabling worker for (localhost) |
|---|---|
| M0022 | proxy: failed to make connection to backend: localhost |
| M0023 | ilink_process_receive() can't receive header |
| M0024 | read_header: ajp_ilink_receive failed |

| M0021 | proxy_connect_backend disabling worker for (localhost) |
|---|---|
| M0022 | proxy: failed to make connection to backend: localhost |
| M0025 | proxy: disabled connection for (localhost) |

112 / 113 / 114

| M0021 | proxy_connect_backend disabling worker for (localhost) |
|---|---|
| M0022 | proxy: failed to make connection to backend: localhost |

| M0021 | proxy_connect_backend disabling worker for (localhost) |
|---|---|
| M0022 | proxy: failed to make connection to backend: localhost |
| M0026 | proxy: attempt to connect to .+ (localhost) failed |

120 / 121

| M0031 | Parent: Received restart signal -- Restarting the server. |
|---|---|
| M0032 | Child .+: Exit event signaled. Child process is ending. |
| M0033 | Child .+: Released the start mutex. |
| M0034 | Child .+: All worker threads have exited. |
| M0035 | Child .+: Child process is running |

122

| M0036 | Parent: Received shutdown signal -- Shutting down the server. |
|---|---|
| M0032 | Child .+: Exit event signaled. Child process is ending. |
| M0033 | Child .+: Released the start mutex. |
| M0034 | Child .+: All worker threads have exited. |
| M0037 | Child .+: Child process is exiting |
| M0036 | Parent: Child process exited successfully. |

FIG. 4A

| ID | MESSAGE | FREQUENCY |
|---|---|---|
| M0001 | Server health check started. | 0 |
| M0002 | Created health check process. | 0 |
| M0003 | Health check process is running. | 0 |
| M0004 | Ping check .+ is successful. | 2 |
| M0005 | TCP port .+ check is successful. | 0 |
| M0006 | .+ process is running. | 22 |
| M0007 | .+ application check is successful. | 0 |
| M0008 | Server health check OK. | 0 |
| M0009 | Ping check .+ is failed. | 3 |
| M0010 | TCP port .+ check is failed. | 0 |
| M0011 | Server health check NG. | 0 |
| M0012 | .+ process is stopped. | 11 |
| M0013 | .+ application check is failed. | 0 |
| M0014 | Resuming normal operations. | 4 |
| M0015 | Created child process .+ | 4 |
| | ... | |

FIG. 4B

| M0004 | Ping check .+ is successful. |
|---|---|
| M0006 | .+ process is running. |
| M0009 | Ping check .+ is failed. |
| M0012 | .+ process is stopped. |
| M0014 | Resuming normal operations. |
| M0015 | Created child process .+ |

FIG. 4C

| M0006 | .+ process is running. |
|---|---|
| M0012 | .+ process is stopped. |

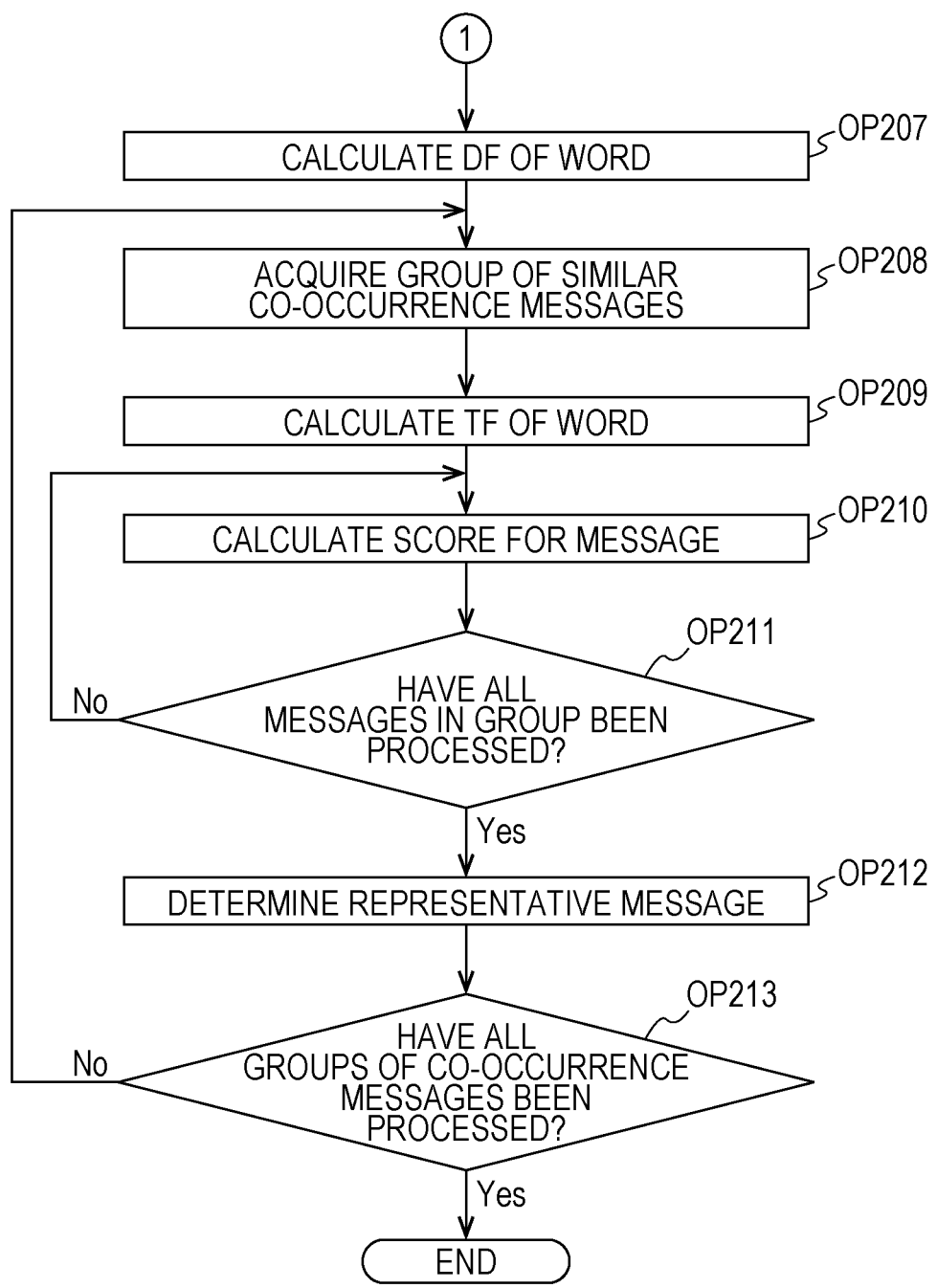

FIG. 7A

| word | TF | DF | TYPE2 | TYPE3 | ALL-ISOLATED | HIGH-ISOLATED | TF-IDF |
|---|---|---|---|---|---|---|---|
| server | 6 | 3 | | O | O | | 2.00 |
| health | 12 | 1 | | | | | 12.00 |
| check | 21 | 2 | | | O | | 10.50 |
| start | 3 | 4 | | O | O | O | 0.75 |
| create | 3 | 3 | | | O | O | 1.00 |
| process | 9 | 5 | O | O | O | O | 1.40 |
| running | 5 | 4 | | O | O | O | 1.25 |
| ping | 3 | 2 | | | O | | 1.50 |

FIG. 7B

| word | TF | DF | TYPE2 | TYPE3 | ALL-ISOLATED | HIGH-ISOLATED | TF-IDF |
|---|---|---|---|---|---|---|---|
| tcp | 3 | 1 | | | | | 3.00 |
| port | 3 | 2 | | | O | | 1.50 |
| successful | 6 | 3 | | O | O | | 2.00 |
| application | 3 | 2 | | | O | | 1.50 |
| fail | 3 | 4 | O | | O | O | 0.75 |
| stop | 1 | 4 | | O | O | O | 0.25 |
| OK | 1 | 2 | | | O | | 0.50 |
| NG | 2 | 3 | | | O | O | 0.67 |

FIG. 7C

| ID | TF-IDF | NUMBER OF WORDS | SCORE |
|---|---|---|---|
| M0001 | 25.25 | 4 | 6.31 |
| M0002 | 24.90 | 4 | 6.23 |
| M0003 | 25.15 | 4 | 6.29 |
| M0004 | 14.00 | 3 | 4.67 |
| M0005 | 17.00 | 4 | 4.25 |
| M0006 | 2.65 | 2 | 1.33 |
| M0007 | 14.00 | 3 | 4.67 |
| M0008 | 25.00 | 4 | 6.25 |
| M0009 | 12.75 | 3 | 4.25 |
| M0010 | 15.75 | 4 | 3.94 |
| M0011 | 25.17 | 4 | 6.29 |
| M0012 | 1.65 | 2 | 0.83 |
| M0013 | 12.75 | 3 | 4.25 |

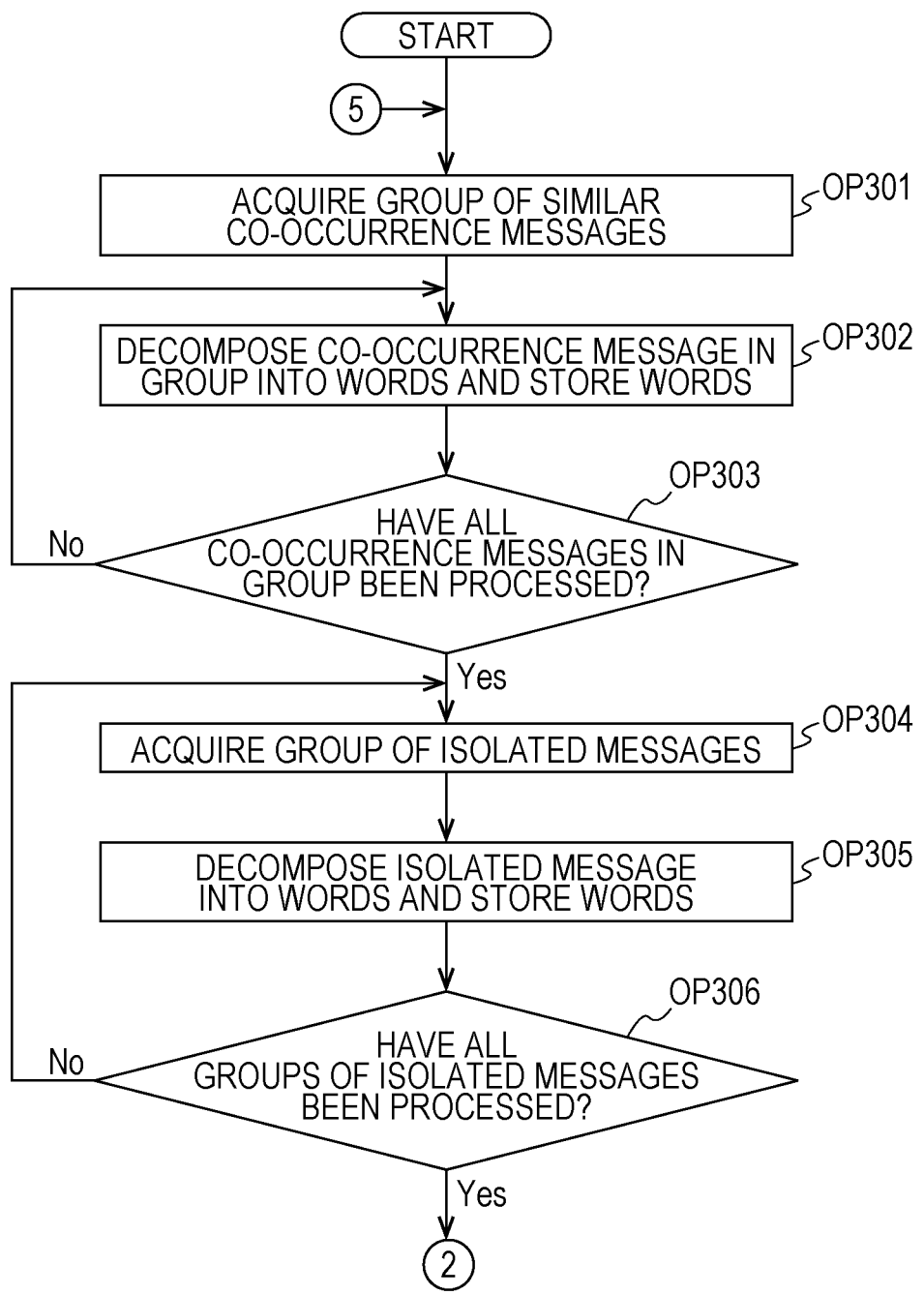

FIG. 11A

| word | TF | DF | CO2 | CO3 | ALL-ISOLATED | HIGH-ISOLATED | TF-IDF |
|---|---|---|---|---|---|---|---|
| server | 1 | 4 | ○ | ○ | ○ | | 0.25 |
| health | 2 | 3 | ○ | ○ | | | 0.67 |
| check | 6 | 4 | ○ | ○ | ○ | | 1.50 |
| create | 1 | 5 | ○ | ○ | ○ | ○ | 0.20 |
| process | 3 | 5 | ○ | ○ | ○ | ○ | 0.60 |
| running | 2 | 5 | ○ | ○ | ○ | ○ | 0.40 |

FIG. 11B

| word | TF | DF | CO2 | CO3 | ALL-ISOLATED | HIGH-ISOLATED | TF-IDF |
|---|---|---|---|---|---|---|---|
| ping | 1 | 4 | ○ | ○ | ○ | | 0.25 |
| tcp | 1 | 3 | ○ | ○ | | | 0.33 |
| port | 1 | 4 | ○ | ○ | ○ | | 0.25 |
| successful | 3 | 4 | ○ | ○ | ○ | | 0.75 |
| application | 1 | 4 | ○ | ○ | ○ | | 0.25 |
| OK | 1 | 2 | | | ○ | | 0.50 |

FIG. 11C

| ID | TF-IDF | NUMBER OF WORDS | SCORE |
|---|---|---|---|
| M0001 | — | — | — |
| M0002 | 2.97 | 4 | 0.74 |
| M0003 | 3.17 | 4 | 0.79 |
| M0004 | 2.25 | 3 | 0.75 |
| M0005 | 2.83 | 4 | 0.71 |
| M0006 | 1.00 | 2 | 0.50 |
| M0007 | 2.50 | 3 | 0.83 |
| M0008 | 3.42 | 4 | 0.86 |

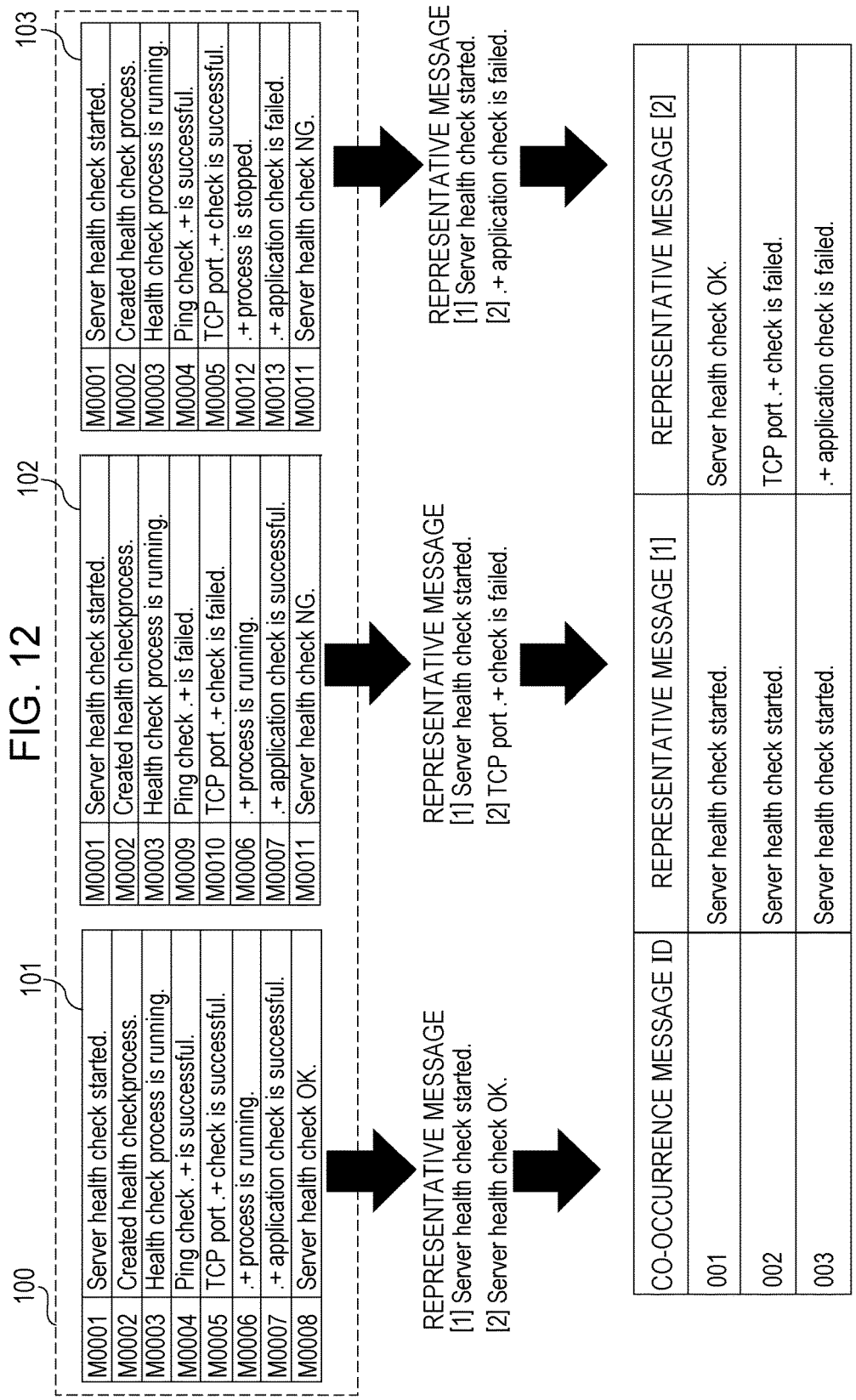

FIG. 16A

|     | ID    | SCORE |
|-----|-------|-------|
| [1] → | M0001 | —     |
|     | M0002 | 0.74  |
|     | M0003 | 0.79  |
| [3] → | M0009 | 0.83  |
|     | M0010 | 0.77  |
|     | M0006 | 0.50  |
|     | M0007 | 0.50  |
| [2] → | M0011 | 0.86  |

FIG. 16B

|     | ID    | SCORE |
|-----|-------|-------|
| [1] → | M0001 | —     |
|     | M0002 | 0.74  |
| [3] → | M0003 | 0.79  |
|     | M0004 | 0.67  |
|     | M0005 | 0.58  |
|     | M0012 | 0.57  |
|     | M0013 | 0.75  |
| [2] → | M0011 | 0.86  |

FIG. 16C

|     | ID    | SCORE |
|-----|-------|-------|
| [1] → | M0001 | —     |
|     | M0002 | 0.74  |
|     | M0003 | 0.79  |
| [3] → | M0009 | 0.83  |
|     | M0010 | 0.77  |
|     | M0006 | 0.50  |
|     | M0007 | 0.50  |
| [2] → | M0011 | 0.86  |

FIG. 16D

|     | ID    | SCORE |
|-----|-------|-------|
| [1] → | M0001 | —     |
|     | M0002 | 0.74  |
| [3] → | M0003 | 0.79  |
|     | M0004 | 0.67  |
|     | M0005 | 0.58  |
|     | M0012 | 0.57  |
|     | M0013 | 0.75  |
| [2] → | M0011 | 0.88  |

FIG. 19A

| word | TF | DF | CO3 | ALL-ISOLATED | HIGH-ISOLATED | TF-IDF |
|---|---|---|---|---|---|---|
| health | 2 | 2 | ○ | | | 1.00 |
| check | 5 | 3 | ○ | ○ | | 1.67 |
| create | 1 | 4 | ○ | ○ | ○ | 0.25 |
| process | 3 | 4 | ○ | ○ | ○ | 0.75 |
| running | 2 | 4 | ○ | ○ | ○ | 0.50 |

FIG. 19B

| word | TF | DF | CO3 | ALL-ISOLATED | HIGH-ISOLATED | TF-IDF |
|---|---|---|---|---|---|---|
| ping | 1 | 3 | ○ | ○ | | 0.33 |
| tcp | 1 | 2 | ○ | | | 0.50 |
| port | 1 | 3 | ○ | ○ | | 0.33 |
| successful | 1 | 3 | ○ | ○ | | 0.33 |
| application | 1 | 3 | ○ | ○ | | 0.33 |
| fail | 2 | 2 | | ○ | | 1.00 |

FIG. 19C

| ID | TF-IDF | NUMBER OF WORDS | SCORE |
|---|---|---|---|
| M0001 | — | — | — |
| M0002 | 3.67 | 4 | 0.92 |
| M0003 | 3.92 | 4 | 0.98 |
| M0009 | 3.00 | 3 | 1.00 |
| M0010 | 3.50 | 4 | 0.88 |
| M0006 | 1.25 | 2 | 0.63 |
| M0007 | 2.33 | 3 | 0.78 |
| M0011 | — | — | — |

INFORMATION PROCESSING APPARATUS AND CONTROL METHOD FOR INFORMATION PROCESSING APPARATUS

CROSS-REFERENCE TO RELATED APPLICATION

This application is based upon and claims the benefit of priority of the prior Japanese Patent Application No. 2017-24506, filed on Feb. 13, 2017, the entire contents of which are incorporated herein by reference.

FIELD

The embodiment discussed herein is related to an information processing apparatus and a control method for the information processing apparatus.

BACKGROUND

In a cloud environment in which resources such as a plurality of computers or peripheral apparatuses are developed on a network, apparatuses such as a database and a server are aggregated to a data center and are maintained and managed. The data center performs operation management of each apparatus through message monitoring. In other words, in a case where a failure occurs in a maintenance target apparatus, a message for sending that the failure is detected is output from the apparatus, and the output message is transmitted to a computer of an operation manager.

A message is repeatedly output from each apparatus in some cases, and thus it is not realistic that an operation manager checks each output message and copes with the message. Therefore, in order to reduce a work burden due to message monitoring of an operation manager, a technique of summarizing a plurality of messages based on a co-occurrence relation of messages has been proposed.

Related techniques are disclosed in, for example, International Publication Pamphlet No. WO 2015/072085, Japanese Laid-open Patent Publication No. 2015-153078, and Japanese Laid-open Patent Publication No. 2013-171471.

However, even if the above-described technique is used, there is further room for improvement in terms of reducing a work burden. For example, there is a case where a person in charge does not understand a feature of a group of a plurality of messages summarized based on a co-occurrence relation in a short period of time. Thus, a system may select a message characterizing a group in each group of messages, and may present the message to a manager along with the group of the message.

However, a message output from an apparatus often includes a so-called fixed form sentence. Thus, in a case where there are a plurality of groups of messages summarized based on a co-occurrence relation, there is a probability of the presence of a message common to the plurality of groups. In this case, a message common to groups is presented as a message characterizing each group, and a difference between features of the respective groups may not be understood even if the presented message is viewed.

SUMMARY

According to an aspect of the embodiments, a non-transitory, computer-readable recording medium having stored therein a program for causing a computer to execute a process, the process comprising: generating a plurality of co-occurrence message bunches by summarizing a plurality of messages based on a relation in which the plurality of messages output from an apparatus are mutually output within a predetermined period; classifying the plurality of generated co-occurrence message bunches into a plurality of groups based on similarity among the co-occurrence message bunches; determining a first message which is a representative of each of the plurality of groups based on an appearance characteristic of a word or a word string included in each message of each of the plurality of groups; determining a second message which is a representative of each of the co-occurrence message bunches and is not repeated based on an appearance characteristic of a word or a word string included in each message in each co-occurrence message bunch of each of the plurality of groups; and outputting, to a monitor, the first message determined for the group including each co-occurrence message bunch and the second message determined for each co-occurrence message bunch in correlation with each co-occurrence message bunch.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of a group of similar co-occurrence message bunches according to the embodiment;

FIGS. 4A to 4C illustrate examples of isolated messages according to the embodiment;

FIG. 6 is a flowchart illustrating a process performed subsequently to the process in FIG. 5 by the management server according to the embodiment;

FIGS. 7A to 7C are diagrams illustrating examples of scores A calculated according to the embodiment;

FIG. 8 is a flowchart illustrating a process performed in OP107 by the management server according to the embodiment;

FIGS. 11A to 11C are diagrams illustrating examples of scores B calculated according to the embodiment;

FIG. 12 is a diagram schematically illustrating a flow of a process in which a representative message of co-occurrence message bunches is determined in the embodiment;

FIGS. 16A to 16D are diagrams illustrating examples of scores B calculated according to the modification example;

FIGS. 19A to 19C are diagrams illustrating examples of scores C calculated according to still another modification example.

DESCRIPTION OF EMBODIMENTS

Hereinafter, an embodiment discussed herein will be described with reference to the drawings. The following detailed description is only an example, and is not intended to limit a configuration of the embodiment.

Figure 1:
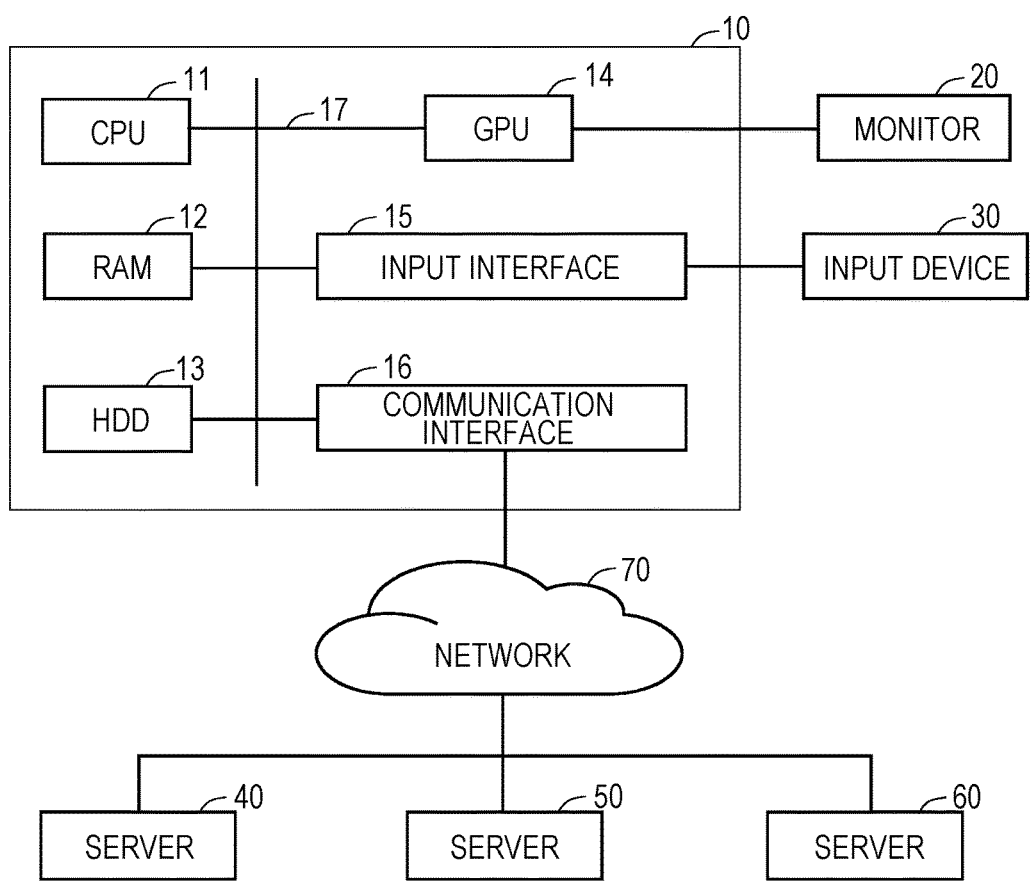
FIG. 1 is a schematic configuration diagram illustrating a configuration of an information processing system according to an embodiment.

FIG. 1 illustrates an example of a schematic configuration of an information processing system 1 in an embodiment. The information processing system 1 includes a management server 10 which is an example of an information processing apparatus, servers 40, 50 and 60, and a network 70. The management server 10 and the servers 40, 50 and 60 are connected to each other via the network 70. The network 70 is a wired or wireless communication network. The number of management server 10, servers 40, 50 and 60, and network 70 is not limited to the number illustrated in FIG. 1. Each of the servers 40, 50 and 60 outputs information regarding a performed process or various apparatuses connected to the servers 40, 50 and 60 as a message, and stores the output message as a log.

As illustrated in FIG. 1, the management server 10 includes a central processing unit (CPU) 11, a random-access memory (RAM) 12, a hard disk drive (HDD) 13, a graphics processing unit (GPU) 14, an input interface 15, and a communication interface 16. The GPU 14, the input interface 15, and the communication interface 16 are respectively connected to a monitor 20, an input device 30, and the network 70. The CPU 11, the RAM 12, the HDD 13, the GPU 14, the input interface 15, and the communication interface 16 are connected to each other via a bus 17. A manager of the management server 10 gives various instructions to the management server 10 by using the input device 30, and checks process results in the management server 10 on the monitor 20. In the present embodiment, the CPU 11 develops various programs stored in the HDD 13 on the RAM 12 and executes the programs, so as to various processes described below.

Hereinafter, a description will be made of processes performed by the management server 10 in the present embodiment with reference to flowcharts. FIGS. 2, 5, 6 and 8 are flowcharts illustrating examples of processes performed by the CPU 11 of the management server 10. As an example, the CPU 11 of the management server 10 starts a process illustrated in the flowchart of FIG. 2 in a case where power is supplied. In OP101, the CPU 11 receives, for example, an instruction for analysis of a co-occurrence message bunch which is input by the manager the input device 30, via the input interface 15. Here, the co-occurrence message bunch indicates an aggregation of a plurality of messages having a "co-occurrence" relation. Here, "co-occurrence" for messages indicates that another message occurs due to the occurrence of a certain message.

Next, in OP102, the CPU 11 functions as a collecting section, and collects messages output from the servers 40, 50 and 60 of the information processing system 1. The CPU 11 causes the process to proceed to OP103. In OP103, the CPU 11 functions as a generation section, and generates a co-occurrence message bunch based on the collected messages. The CPU 11 regards, for example, messages having a so-called high co-occurrence probability to have a co-occurrence relation, and generates the messages as a co-occurrence message bunch. Consequently, the CPU 11 summarizes a plurality of messages output from the apparatuses based on a relation in which mutual messages are output within a predetermined period, so as to generate a plurality of co-occurrence message bunches.

Here, the co-occurrence probability is an index indicating to what extent of probability another message co-occurs before or after a certain message occurs. The co-occurrence relation is a relation in which mutual messages are output within a predetermined period. As an example, for a certain set of messages, a message which is received earlier is referred to as a "pre-message", and a message which is received later is referred to as a "post-message". The number of times of occurrence of a pre-message is referred to as a "pre-message occurrence number". A predetermined period after a pre-message occurs is referred to as a "co-occurrence period". For example, the co-occurrence period may be a time such as 60 minutes.

The number of times of occurrence of a certain post-message in a co-occurrence period after the occurrence of a certain pre-message is referred to as a "pre-messagepost-message number". The co-occurrence probability is calculated as the number of times of occurrence of a post-message in the co-occurrence period, occupying the number of times of occurrence of a certain pre-message in a certain time period. In other words, the co-occurrence probability is "(co-occurrence probability)=(pre-messagepost-message number)/(pre-message occurrence number)". Therefore, it is regarded that there is a higher probability that two messages may co-occur as a co-occurrence probability of the messages becomes higher. The degree of a co-occurrence probability that messages are regarded to have a co-occurrence relation may be determined as appropriate.

In OP104, the CPU 11 functions as a classification section, and classifies the plurality of generated co-occurrence message bunches into groups of the co-occurrence message bunches similar to each other. Here, the groups of similar co-occurrence message bunches indicate groups of co-occurrence message bunches summarized by using similarity. The similarity is computed based on whether or not many common words or messages common to co-occurrence message bunches are included therein. Consequently, the CPU 11 classifies the plurality of generated co-occurrence message bunches into a plurality of groups based on the similarity among the co-occurrence message bunches. In the following description, a group of co-occurrence message bunches similar to each other will be referred to as a "group of similar co-occurrence message bunches".

FIG. 3 illustrates examples of groups of similar co-occurrence message bunches classified in OP104. FIG. 3 illustrates groups 100, 110 and 120 of similar co-occurrence message bunches. The group 100 includes co-occurrence message bunches 101, 102 and 103. The co-occurrence message bunch 101 is an example of a first co-occurrence message bunch, and the co-occurrence message bunch 102 is an example of a second co-occurrence message bunch. The group 110 includes co-occurrence message bunches 111, 112, 113, and 114. The group 120 includes co-occurrence message bunches 121 and 122.

In the present embodiment, each message of a co-occurrence message bunch includes identification information for identifying the message and a body of the message. For example, in the co-occurrence message bunch 101, in a message of a first row, "M0001" is identification information for identifying the message, and "Server health check started." is a body of the message. The same message may be included in other co-occurrence message bunches (in the figure, the co-occurrence message bunches 102 and 103). In OP104, if the classification of the groups of the co-occurrence message bunches is completed, the CPU 11 stores each classified group in the HDD 13, and causes the process to proceed to OP105.

In OP105, the CPU 11 groups messages (hereinafter, referred to as "isolated messages") which are not included in a co-occurrence message bunch among a plurality of messages collected in OP102 based on an occurrence frequency of each isolated message, so as to create a group of the isolated messages. FIGS. 4A to 4C illustrate examples of groups of isolated messages created in OP105. FIG. 4A illustrates examples of messages collected in OP102. The CPU 11 generates, for each message, identification information (in the figure, an "ID" field), a body of the message (in the figure, a "message" field), and information indicating a sum (in the figure, a "frequency" field) of the number of times of occurrence of an isolated message. Here, the sum of the number of times of occurrence of an isolated message is the number of times of occurrence of a message as an isolated message for the plurality of messages collected in OP102.

In OP105, the CPU 11 generates a group including all isolated messages and a group including isolated messages having a high occurrence frequency based on the generated information. In the present embodiment, for example, the degree of an occurrence frequency may be determined according to the number of times of occurrence of an isolated message or a proportion of occurrence of an isolated message. Here, the proportion of occurrence of an isolated message may be defined a proportion of the number of times of occurrence of the isolated message occupying a sum of the number of times of respective messages in a group of isolated messages. For example, the degree of an occurrence frequency may be determined according to whether or not the number of times of occurrence or a proportion of occurrence of an isolated message, or the like exceeds a predetermined threshold value. Determination of the degree of an occurrence frequency is not limited to the above-described procedures. For example, the CPU 11 may compute a proportion of occurrence with the number of times of occurrence of an isolated message having the largest number of times of occurrence as a reference instead of a sum of the number of times of occurrence of respective messages in a group of isolated messages. In other words, the CPU 11 may compute a ratio of the number of times of occurrence of each isolated message to the number of times of occurrence of an isolated message having the largest number of times of occurrence. The degree of an occurrence frequency of an isolated message may be determined based on determination of whether or not the computed ratio exceeds a predetermined threshold value for each isolated message.

FIG. 4B illustrates an example in which messages of which the number of times of occurrence is one or more are collected, and a group including all isolated messages is generated in FIG. 4A. FIG. 4C illustrates an example in which an isolated message of which a ratio of the number of times of occurrence of an isolated message to the number of times of occurrence of an isolated message having the largest number of times of occurrence is 50% or more is set as an isolated message having a high occurrence frequency, based on the information regarding the group of the messages illustrated in FIG. 4A. In FIG. 4A, a message having the largest number of times of occurrence is a message (".+process is running.") with a message ID "M0006", and the number of times of occurrence thereof is "22". A message of which the number of times of occurrence is equal to or more than 50% ("11") of the number of times of occurrence of the message with the ID "M0006" is set as an isolated message having a high occurrence frequency, and is thus created as the group illustrated in FIG. 4C. A criterion for determining the degree of an occurrence frequency of an isolated message is not limited to the above description, and may employ other criteria for the number of times of occurrence or threshold values. The CPU 11 creates the group of the isolated messages in OP105, stores the created group in the HDD 13, and then performs a process in a subroutine of OP106.

In OP105, the CPU 11 may create a plurality of groups of isolated messages. The CPU 11 may determine the number of groups of isolated messages of which an appearance frequency is high, by setting a threshold value for the number of groups of similar co-occurrence messages, the number of types of isolated messages, a proportion of an isolated message occupying all collected messages, a proportion of the number of times of occurrence of an isolated message, or the like. For example, the CPU 11 may determine the number of groups of isolated messages created in OP105 to be one in a case where the number of types of isolated messages is twenty or less, to be two in a case where the number of types thereof is twenty-one to forty, and to be three in a case where the number of types thereof is forty-one to eighty. The CPU 11 may create two groups such as a group in which a proportion of the number of times of occurrence of an isolated message is 33% or more and a group in which the proportion is 67% or more. A plurality of groups of isolated messages are created as mentioned above, and thus an isolated message having a high occurrence frequency is more hardly selected as a representative message.

Figure 2:
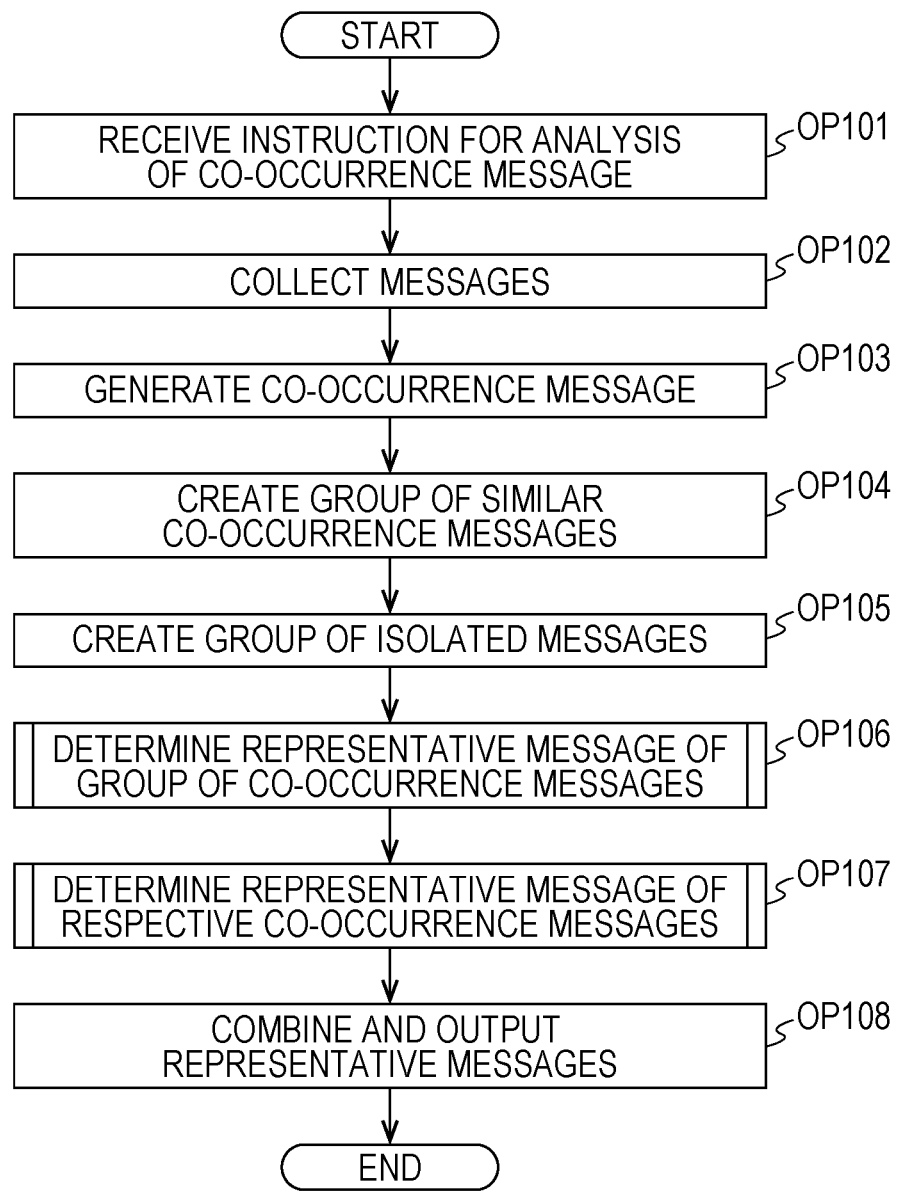
FIG. 2 is a flowchart illustrating a process performed by a management server according to the embodiment.
Figure 5:
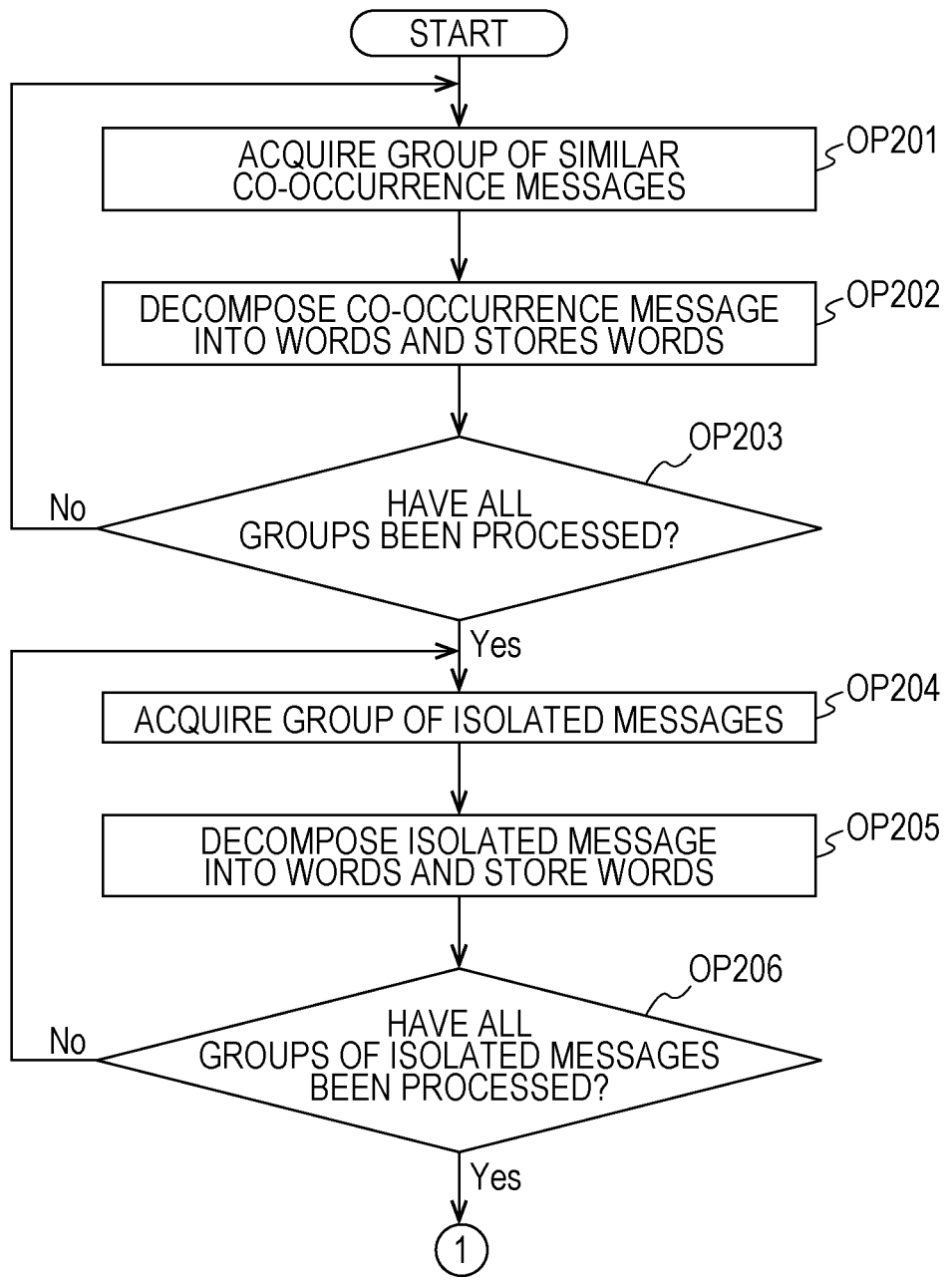
FIG. 5 is a flowchart illustrating a process performed in OP106 by the management server according to the embodiment.

FIGS. 5 and 6 illustrate detailed processes of a subroutine executed in OP106 in FIG. 2. The CPU 11 performs processes in FIGS. 5 and 6 as a first determination section. In this subroutine, the CPU 11 determines a representative message of each of a plurality of groups based on an appearance characteristic of a word included in each message in each of the plurality of groups. In OP201, the CPU 11 acquires any one of the groups of the similar co-occurrence message bunches classified in OP104 from the HDD 13. Next, the CPU 11 causes the process to proceed to OP202. In OP202, the CPU 11 decomposes each message of the groups of the similar co-occurrence message bunches acquired in OP201 into words, and stores each word in the HDD 13. Next, in OP203, the CPU 11 determines whether or not the process in OP202 has been performed on all of the groups of the similar co-occurrence message bunches classified in OP104. In a case where the process in OP202 has been performed on all of the groups of the similar co-occurrence message bunches (OP203: Yes), the CPU 11 causes the process to proceed to OP204. On the other hand, in a case where there is a group of the similar co-occurrence message bunches on which the process in OP202 has not been performed (OP203: No), the CPU 11 returns the process to OP201.

In OP204, the CPU 11 acquires any one of the groups of the isolated messages created in the OP105 from the HDD 13. Next, the CPU 11 causes the process to proceed to OP205. In OP205, the CPU 11 decomposes each isolated message included in the group of the isolated messages acquired in OP204 into words, and stores each word in the HDD 13. Next, in OP206, the CPU 11 determines whether or not the process in OP205 has been performed on all of the groups of the isolated messages generated in OP105. In a case where the process in OP205 has been performed on all of the groups of the isolated messages (OP206: Yes), the CPU 11 causes the process to proceed to OP207. On the other hand, in a case where there is a group of the isolated messages on which the process in OP205 has not been performed (OP206: No), the CPU 11 returns the process to OP204.

Next, in OP207, the CPU 11 calculates the number of groups in which each word stored in OP202 and OP205 appears in the groups of the similar co-occurrence message bunches classified in OP104 and the groups of the isolated messages created in OP105. The number of groups may be calculated by using a method of calculating a so-called document frequency (DF) of each word. In the following description, in each group of similar co-occurrence message bunches, a group including all isolated messages, and a group of isolated messages created based on the degree of an occurrence frequency, the number of groups in which each word appears will be referred to as DF. Alternatively, in each co-occurrence message bunch in a group of similar co-occurrence message bunches, and a message bunch of each group of isolated messages, the number of co-occurrence message bunch and message bunches of isolated messages in which each word appears will be referred to as DF. The CPU 11 stores the calculated DF of each word in the HDD 13, and causes the process to proceed to OP208.

In OP208, the CPU 11 acquires any one of the groups of the similar co-occurrence message bunches classified in OP104 from the HDD 13. Next, in OP209, the CPU 11 calculates the number of times of appearance in which each word included in a co-occurrence message bunch in the group of the similar co-occurrence message bunches acquired in OP208 appears in the group. The number of times of appearance may be calculated by using a method of calculating a so-called term frequency (TF) of each word. In the following description, the number of times of appearance of each word will be referred to as TF. The CPU 11 stores the calculated TF of each word in the HDD 13, and causes the process to proceed to OP210.

OP210, the CPU 11 calculates a score A for a single message in the group of the similar co-occurrence message bunches acquired in OP208. In the OP210, the CPU 11 uses the number of groups in which each word appears in a plurality of groups with respect to each word included in each message of the plurality of groups, and the number of times of appearance of each word in a group including a message including each word. The CPU 11 calculates the score A indicating relevance to a feature based on the message content of a group including each message with respect to each message in each group, based on the number of groups and the number of times of appearance. The CPU 11 calculates the score A such that relevance to a feature based on the message content of a group including each message is reduced as the number of groups increases. The CPU 11 calculates the score A such that relevance to a feature based on the message content of a group including each message increases as the number of times of appearance increases. The CPU 11 calculates the score A to become lower as the number of times of appearance of each word in a message included in a co-occurrence message bunch among a plurality of collected messages.

Here, the score A is a value calculated according to the following Equation (1) by using values of DF and TF of each word included in each message. The score A is an example of a first score indicating relevance to a group of similar co-occurrence message bunches. The relevance between a message and a group of similar co-occurrence message bunches is an example of first relevance to a feature based on the message content of a group including each message.

$$(\text{Score } A) = (\text{sum of values of TF-}IDF \text{ of each word in message}) \times \{1/(\text{number of words in message})\} \quad (1)$$

Here, TF-IDF stands for term frequency—inverse document frequency. A value of TF-IDF of each word indicates a value calculated according to the following Equation (2) for each word.

$$(\text{Value of TF-}IDF) = (\text{value of TF}) \times \{1/(\text{value of DF})\} \quad (2)$$

In the present embodiment, it can be said that the score A increases as a value of TF-IDF increases. As represented in Equation (2), a value of TF-IDF is reduced as a value of DF increases. A great value of DF indicates that the number of times in which a DF calculation target word appears in other groups or isolated messages is large. Therefore, a message including a word with a great value of DF has a high probability of appearing in other groups or isolated messages. Therefore, in the present embodiment, the score A for a message including a word with a large number of times of appearance in other groups or isolated messages is calculated to be low. In other words, the score A is calculated such that relevance to a group is reduced as a value of DF becomes greater.

As represented in Equation (2), a value of TF-IDF increases as a value of TF becomes greater. A great value of TF indicates that an appearance frequency of a TF calculation target word in a group including a message which is a score A calculation target is high. Therefore, it can be said that a message including a word with a great value of TF includes a word with a larger number of times of appearance in a group than other messages. Therefore, in the present embodiment, the score A for a message including lots of words with a large number of times of appearance in a group is calculated to be increased. In other words, the score A is calculated such that relevance to a group increases as a value of TF becomes greater.

In a case where the score A for a single message in the group of the similar co-occurrence message bunches is calculated, the CPU 11 stores the calculated score A in the HDD 13, and causes the process to proceed to OP211. In OP211, the CPU 11 determines whether or not the score A has been calculated for all messages in the group of the similar co-occurrence message bunches. In a case where the score A has been calculated for all messages in the group of the similar co-occurrence message bunches (OP211: Yes), the CPU 11 causes the process to proceeds to OP212. On the other hand, in a case where there is a message for which the score A has not been calculated among the messages in the group of the similar co-occurrence message bunches (OP211: No), the CPU 11 returns the process to OP210. The score A is calculated for the message for which the score A has not been calculated (OP210).

FIGS. 7A to 7C illustrate calculation examples of the scores A calculated through the processes in OP210 and OP211. FIGS. 7A to 7C illustrate cases where the scores A are calculated for the co-occurrence message bunches 101, 102 and 103 included in the group 100 of the similar co-occurrence message bunches illustrated in FIG. 3. In FIGS. 7A to 7C, groups of similar co-occurrence message bunches classified in OP104 are assumed to be three groups such as the groups 100, 110 and 120. FIGS. 7A and 7B illustrate TF (in the figure, a "TF" field) and DF (in the figure, a "DF" field) of each word included in the co-occurrence message bunches 101, 102 and 103. DF in FIGS. 7A and 7B is an example of the number of groups in which each word appears in a plurality of groups. TF in FIGS. 7A and 7B is an example of the number of times of appearance of each word in a group including a message including each word. FIGS. 7A and 7B illustrate whether or not each word also appears in the group 110 (in the figure, a "type2" field), and whether or not each word also appears in the group 120 (in the figure, a "type3" field). In the figure, "O" indicates that a word appears in the group, and a blank field indicates that a word does not appear in the group. FIGS. 7A and 7B illustrate whether or not each word also appears in a group including all isolated messages (in the figure, an "all-isolated" field), and whether or not each word also appears in a group of an isolated message with a high occurrence frequency (in the figure, a "high-isolated" field). FIGS. 7A and 7B illustrate a value of TF-IDF of each word.

FIG. 7C illustrates a sum (in the figure, a "TF-IDF" field) of TF-IDF calculated for each message in the group 100 of the similar co-occurrence message bunches, the number of words (in the figure, a "number of words" field) included in each message, and a value of the score A (in the figure, a "score" field) calculated according to Equation (1).

In the examples illustrated in FIGS. 7A to 7C, a value of the "DF" field is a value obtained by adding the number of "O" in the respective fields including the "type2" field, the "type3" field, the "all-isolated" field, and the "high-isolated" field to "1". In FIGS. 7A to 7C, DF is calculated for word in the group 100 of the similar co-occurrence message bunches, and thus it is clear that each word appears in the group 100. In other words, in a case where a "type1" field indicating whether or not each word appears in the group 100 is provided, "O" is written in the "type1" field of each word. Therefore, a value of the "DF" field in the figure is a value obtained by adding the number of "O" in the respective fields including the "type2" field, the "type3" field, the "all-isolated" field, and the "high-isolated" field to "1.".

In the present embodiment, when the score A is calculated, as represented in Equations (1) and (2), a value obtained by multiplying a value of TF by an inverse number of a value of DF is used as a value of TF-IDF. In other words, the score A for a word for which "O" is written in the "all-isolated" or "high-isolated" field is calculated to be low. As mentioned above, in the present embodiment, the score A for a word included in a message of which a frequency of appearing as a message other than a co-occurrence message bunch is high is calculated to be low. As a result, when a representative message of a co-occurrence message bunch is determined, a message including a word in a message of which a frequency of appearing as a message other than a co-occurrence message bunch is high is hardly determined as a representative message.

In OP212, the CPU 11 determines a message corresponding to the maximum value of the values of the score A for the respective messages calculated in OP210 and OP211 as a representative message representing the group of the similar co-occurrence message bunches. The representative message is an example of a first message. In a case of the example illustrated in FIG. 7C, the message having the message ID "M0001" for which a value of the score A is "6.31" is a representative message of the group 100 of the similar co-occurrence message bunches. In the present embodiment, the score A is calculated, and thus it is possible to determine a message characterizing a group among messages in a group of similar co-occurrence message bunches. In a case where the representative message of the group of the similar co-occurrence message bunches acquired in OP208 is determined, the CPU 11 causes the process to proceed to OP213.

In OP213, the CPU 11 determines whether or not representative messages have been determined for all of the groups of the similar co-occurrence message bunches acquired in OP201. In a case where representative messages have been determined for all of the groups of the similar co-occurrence message bunches (OP213: Yes), the CPU 11 finishes the process in this subroutine, and causes the process to proceed to OP107. On the other hand, in a case where there is a group of the similar co-occurrence message bunches for which a representative message has not been determined (OP213: No), the CPU 11 returns the process to OP208. The CPU 11 performs the processes in OP208 to OP212, and determines a representative message for a group of the similar co-occurrence message bunches for which the representative message is not determined.

Figure 9:
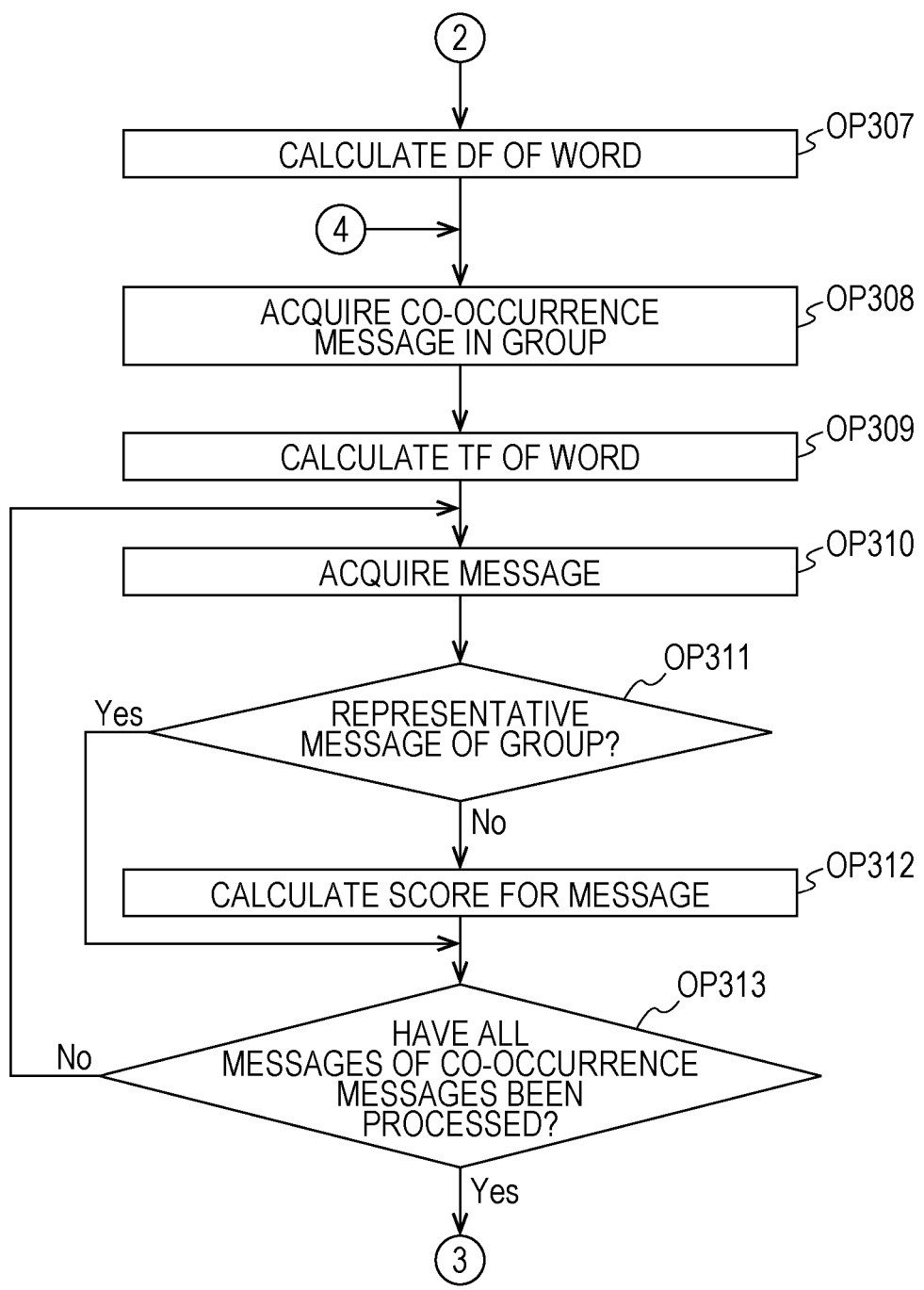
FIG. 9 is a flowchart illustrating a process performed subsequently to the process in FIG. 8 by the management server according to the embodiment.
Figure 10:
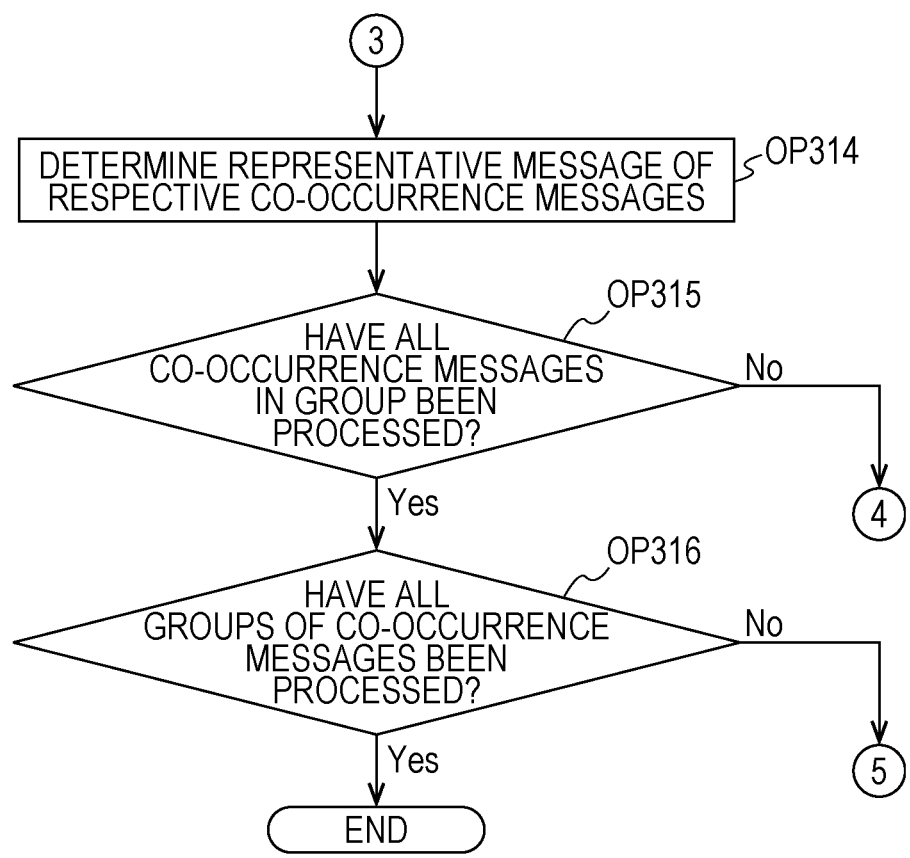
FIG. 10 is a flowchart illustrating a process performed subsequently to the process in FIG. 9 by the management server according to the embodiment.

Next, with reference to FIGS. 8 to 10, a description will be made of a detailed process in a subroutine executed in OP107 in FIG. 2 by the CPU 11 which functions as a second determination section. In the subroutine of OP107, a representative message of each similar co-occurrence message bunch is determined. In this subroutine, the CPU 11 determines messages which represent respective co-occurrence message bunch and are not repeated, that is, do not overlap each other, based on appearance characteristics of a word included in each message in respective co-occurrence message bunches of each of a plurality of groups. A message determined in OP107 is an example of a second message. In the subroutine, the CPU 11 determines a representative message of each co-occurrence message bunch in each group of similar co-occurrence message bunches.

In OP301, the CPU 11 acquires any one of the groups of the similar co-occurrence message bunches classified in OP104 from the HDD 13. Next, in OP302, the CPU 11 decomposes each message included in a single co-occurrence message bunch of the groups of the similar co-occurrence message bunches acquired in OP301 into words. The CPU 11 stores the words obtained through decomposition in the HDD 13. Next, the CPU 11 causes the process to proceed to OP303.

In OP303, the CPU 11 determines whether or not a message has been decomposed into words with respect to all of the co-occurrence message bunches in the group of the similar co-occurrence message bunches acquired in OP301. In a case where a message has been decomposed into words with respect to all of the co-occurrence message bunches in the group of the similar co-occurrence message bunches (OP303: Yes), the CPU 11 causes the process to proceed to OP304. On the other hand, in a case where there is a co-occurrence message bunch for which a message has not been decomposed into words (OP303: No), the CPU 11 returns the process to OP302, and decomposes a message of the co-occurrence message bunch into words.

In OP304, in the same manner as in OP204, the CPU 11 acquires any one of the groups of the isolated messages created in the OP105 from the HDD 13. In OP305, in the same manner as in OP205, the CPU 11 decomposes each isolated message included in the group of the isolated messages acquired in OP304 into words, and stores each word in the HDD 13. Next, in OP306, the CPU 11 determines whether or not the process in OP305 has been performed on all of the groups of the isolated messages generated in OP105. In a case where the process in OP305 has been performed on all of the groups of the isolated messages (OP306: Yes), the CPU 11 causes the process to proceed to OP307. On the other hand, in a case where there is a group of the isolated messages on which the process in OP305 has not been performed (OP306: No), the CPU 11 returns the process to OP304.

Next, in OP307, the CPU 11 calculates DF of each word in each co-occurrence message bunch of the group of the similar co-occurrence message bunches acquired in OP301 and each group of the isolated messages created in OP105 with respect to each word stored in OP305. The CPU 11 stores the calculated DF of each word in the HDD 13, and causes the process to proceed to OP308.

In OP308, the CPU 11 acquires any one co-occurrence message bunch of the group of the similar co-occurrence message bunches acquired in OP301. Next, the CPU 11 causes the process to proceed to OP309. In OP309, the CPU 11 calculates TF of each word of a message included in the co-occurrence message bunch acquired in OP308. Next, the CPU 11 causes the process to proceed to OP310.

In OP310, the CPU 11 acquires any one message included in the co-occurrence message bunch acquired in OP308. Next, the CPU 11 causes the process to proceed to OP311. In OP311, the CPU 11 determines whether or not the message acquired in OP310 is the representative message of the group of the similar co-occurrence message bunches determined in OP212. In a case where the message acquired in OP310 is the representative message of the group of the similar co-occurrence message bunches (OP311: Yes), the CPU 11 causes the process to proceed to OP313. On the other hand, in a case where the message acquired in OP310 is not the representative message of the group of the similar co-occurrence message bunches (OP311: No), the CPU 11 causes the process to proceed to OP312.

In OP312, the CPU 11 calculates a score B for the message acquired in OP310. In OP312, the CPU 11 calculates the score B indicating relevance to a feature based on the message content of each co-occurrence message bunch for each message of the co-occurrence message bunch with respect to each word included in each co-occurrence message bunch of the group acquired in OP301, based on the number of co-occurrence message bunches in which each word appears in a group including each co-occurrence message bunch and the number of times of appearance of each word in each co-occurrence message bunch. The CPU 11 calculates the score B such that the relevance to the feature based on the message content of each co-occurrence message bunch is reduced as the number of co-occurrence message bunches increases. The CPU 11 calculates the score B such that the relevance to the feature based on the message content of each co-occurrence message bunch increases as the number of times of appearance of each word in each co-occurrence message bunch increases. The CPU 11 calculates the score B to be low as the number of times of appearance of each word in each co-occurrence message bunch in a message not included in the co-occurrence message bunch among a plurality of collected messages increases.

Here, the score B is a value calculated according to Equations (1) and (2) by using values of DF and TF of each word included in each message of a co-occurrence message bunch. The score B is an example of a second score. In calculation of the score A, the score is calculated for a message included in a co-occurrence message bunch of a group of similar co-occurrence message bunches based on a value of TF-IDF. On the other hand, in calculation of the score B, the score is calculated for a message included in a single co-occurrence message bunch based on a value of TF-IDF. However, also in calculation of the score B, in the same manner as in the score A, the score B is calculated such that relevance to a co-occurrence message bunch is reduced as a value of DF becomes greater. The score B is calculated such that relevance to a co-occurrence message bunch increases as a value of TF becomes greater. The relevance between each message and a co-occurrence message bunch is an example of second relevance to a feature based on the message content of a co-occurrence message bunch including each message. In a case where the score B for the message acquired in OP310 is calculated, the CPU 11 stores the calculated score B in the HDD 13, and causes the process to proceed to OP313.

FIGS. 11A to 11C illustrate calculation examples of the scores B calculated through the processes in OP312. FIGS. 11A to 11C illustrate cases where the scores B are calculated for the co-occurrence message bunch 101 included in the group 100 of the similar co-occurrence message bunches illustrated in FIG. 3. FIGS. 11A and 11B illustrate TF (in the figure, a "TF" field) and DF (in the figure, a "DF" field) of each word included in the co-occurrence message bunch 101. FIGS. 11A and 11B illustrate whether or not each word also appears in the co-occurrence message bunch 102 (in the figure, a "co2" field), and whether or not each word also appears in the co-occurrence message bunch 103 (in the figure, a "co3" field). In the figure, "O" indicates that a word appears in the co-occurrence message bunch, and a blank field indicates that a word does not appear in the co-occurrence message bunch. FIGS. 11A and 11B illustrate whether or not each word also appears in a group including all isolated messages (in the figure, an "all-isolated" field), and whether or not each word also appears in a group of an isolated message with a high occurrence frequency (in the figure, a "high-isolated" field). FIGS. 11A and 11B illustrate a value of TF-IDF of each word.

FIG. 11C illustrates a sum (in the figure, a "TF-IDF" field) of TF-IDF calculated for each message of the co-occurrence message bunch 101 in the group 100 of the similar co-occurrence message bunches, the number of words (in the figure, a "number of words" field) included in each message, and a value of the score B (in the figure, a "score" field) calculated according to Equation (1). In the examples illustrated in FIGS. 11A and 11B, in the same manner as in FIGS. 7A and 7B, a value of the "DF" field is a value obtained by adding the number of "O" in the respective fields including the "cot" field, the "co3" field, the "all-isolated" field, and the "high-isolated" field to "1". In the present embodiment, since a representative message of the group 100 of the similar co-occurrence message bunches is determined as the message having the ID "M0001" in OP212, in FIG. 11C, the score B for the message having the ID "M0001" is not calculated.

OP313, the CPU 11 determines whether or not the score B has been calculated for each message of the co-occurrence message bunch acquired in OP308. In a case where the score B has been calculated for each message of the co-occurrence message bunch (OP313: Yes), the CPU 11 causes the process to proceed to OP314. On the other hand, in a case where there is a message for which the score B has not been calculated in the co-occurrence message bunch (OP313: No), the CPU 11 returns the process to OP310. The CPU 11 calculates the score B for the message for which the score B has not been calculated through the processes in OP310 to OP312.

In OP314, the CPU 11 determines a message for which the score B for each message of the co-occurrence message bunch calculated in OP312 is highest as a representative message of the co-occurrence message bunch acquired in OP308. In cases of the examples illustrated in FIGS. 11A to 11C, as illustrated in FIG. 11C, a message (score B: 0.86) having the ID "M0008" for which the score B is highest is determined as a representative message of the co-occurrence message bunch 101. In a case where the representative message is determined, the CPU 11 causes the process to proceed to OP315.

In OP315, the CPU 11 determines whether or not representative messages have been determined for all of the co-occurrence message bunches in the group of the similar co-occurrence message bunches acquired in OP301. In a case where representative messages have been determined for all of the co-occurrence message bunches in the group of the similar co-occurrence message bunches acquired in OP301 (OP315: Yes), the CPU 11 causes the process to proceed to OP316. In a case where there is a co-occurrence message bunch for which a representative message has not been determined in the group of the similar co-occurrence message bunches acquired in OP301 (OP315: No), the CPU 11 returns the process to OP308. The CPU 11 performs the processes in OP308 to OP314, and determines a representative message for a co-occurrence message bunch for which the representative message is not determined.

In OP316, the CPU 11 determines whether or not the process of determining a representative message of each co-occurrence message bunch in the group has been performed on all of the groups of the similar co-occurrence message bunches classified in OP104. In a case where representative messages of co-occurrence message bunches have been determined for all of the groups of the similar co-occurrence message bunches classified in OP104 (OP316: Yes), the CPU 11 finishes this subroutine, and causes the process to proceed to OP108. On the other hand, in a case where there is a group of the similar co-occurrence message bunches for which a representative message of a co-occurrence message bunch has not been determined (OP316: No), the CPU 11 returns the process to OP301. The CPU 11 performs the processes in OP301 to OP315, and determines a representative message of a co-occurrence message bunch for a group of the similar co-occurrence message bunches for which the representative message of the co-occurrence message bunch is not determined.

Next, in OP108 in FIG. 2, the CPU 11 creates a representative message of each co-occurrence message bunch by using the representative message of each group of the similar co-occurrence message bunches and the representative message of each co-occurrence message bunch, created in the subroutines of OP106 and OP107. Specifically, the CPU 11 combines a representative message of a co-occurrence message bunch with a representative message of a group of similar co-occurrence message bunches including the co-occurrence message bunch with respect to each co-occurrence message bunch. The CPU 11 functions as an output section, and outputs the combined representative message to the monitor 20 or the HDD 13. Consequently, the CPU 11 outputs each co-occurrence message bunch, a message determined for a group including each co-occurrence message bunch, and a message determined for each co-occurrence message bunch in correlation with each other.

FIG. 12 schematically illustrates examples of representative messages created for the respective co-occurrence message bunches 101, 102 and 103 in the group 100 of the similar co-occurrence message bunches. Through the process in the subroutine of OP106, a representative message of the group 100 of the similar co-occurrence message bunches is determined as "Server health check started." (in the figure, [1]). Through the process in the subroutine of OP107, representative messages of the co-occurrence message bunches 101, 102 and 103 are respectively determined as "Server health check OK.", "TCP port.+check is failed.", and ".+application check is failed." (in the figure, [2]).

In OP108, the CPU 11 determines representative messages of the co-occurrence message bunch 101 as "Server health check started." (representative message [1]) and "Server health check OK." (representative message [2]). In OP108, the CPU 11 determines representative messages of the co-occurrence message bunch 102 as "Server health check started." (representative message [1]) and "TCP port.+check is failed." (representative message [2]). In OP108, the CPU 11 determines representative messages of the co-occurrence message bunch 103 as "Server health check started." (representative message [1]) and ".+application check is failed." (representative message [2]).

In OP108, in a case where the representative messages created through the processes in the subroutines are combined with each other, and thus a representative message of each co-occurrence message bunch is created, the CPU 11 stores the co-occurrence message bunch and the created representative message in the HDD 13 in correlation with each other. The CPU 11 finishes the process in the flowchart. Consequently, it is possible to create a representative message in which the content of each co-occurrence message bunch is reflected and which causes a co-occurrence message bunch to be easily differentiated from another co-occurrence message bunch with respect to each co-occurrence message bunch generated based on messages output from the respective servers of the information processing system 1.

The present embodiment has been described, but a configuration of or a process in each server or the like is not limited to the embodiment, and variously modified within the scope without departing from the technical spirit of the present disclosure. For example, in the embodiment, a representative message of a co-occurrence message bunch is determined for a plurality of messages output from a plurality of servers, but may be determined for a plurality of messages output from a single server. Hereinafter, modification examples of the embodiment will be described. In the following description, an element or a process corresponding to the element or the process in the embodiment is given the same reference numeral, and detailed description thereof will be omitted.

Modification Example 1

Figure 13:
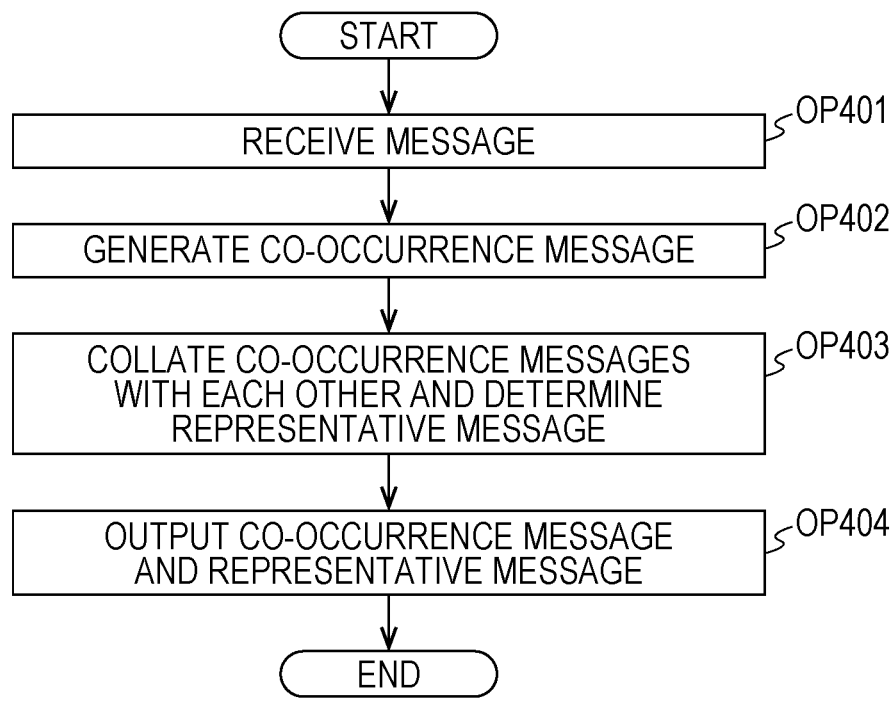
FIG. 13 is a flowchart illustrating a process performed on a message received from a server by the management server in the embodiment.

With reference to FIG. 13, Modification Example 1 of the embodiment will be described. In the present modification example, the CPU 11 creates a representative message of each co-occurrence message bunch through the processes in OP301 to OP316, and then performs processes in OP401 to OP404 described below. The CPU 11 may perform the processes in OP401 to OP404 along with the processes in OP301 to OP316.

In OP401, the CPU 11 receives messages from the servers 40, 50 and 60. Each of the servers 40, 50 and 60 may execute an agent, and each server may cause a message output from the server to be transmitted to the management server 10 according to a process of the agent. Alternatively, the CPU 11 may instruct each of the servers 40, 50 and 60 to transmit a message output from the servers to the management server 10.

Next, in OP402, in the same manner as in OP103, the CPU 11 generates a co-occurrence message bunch based on the messages received in OP401. Next, in OP403, the co-occurrence message bunch generated in OP402 is collated with the co-occurrence message bunch stored in the HDD 13 in OP108. In the present modification example, it is assumed that the management server 10 performs the process according to the embodiment, and thus a set of a co-occurrence message bunch and a representative message is stored in the HDD 13 in advance. Therefore, the co-occurrence message bunch generated in OP402 is stored in the HDD 13 in correlation with the representative message.

Therefore, in OP403, the CPU 11 collates the co-occurrence message bunch generated in OP402 with the co-occurrence message bunch stored in the HDD 13 in OP108, and can thus determine a representative message of the co-occurrence message bunch. Next, in OP404, the CPU 11 displays a set of the co-occurrence message bunch generated in OP402 and the representative message determined in OP403 on the monitor 20. Consequently, the manager of the management server 10 checks the representative message of the co-occurrence message bunch of the messages output from the servers 40, 50 and 60, and can thus understand the content of the co-occurrence message bunch of the messages.

Modification Example 2

Figure 14:
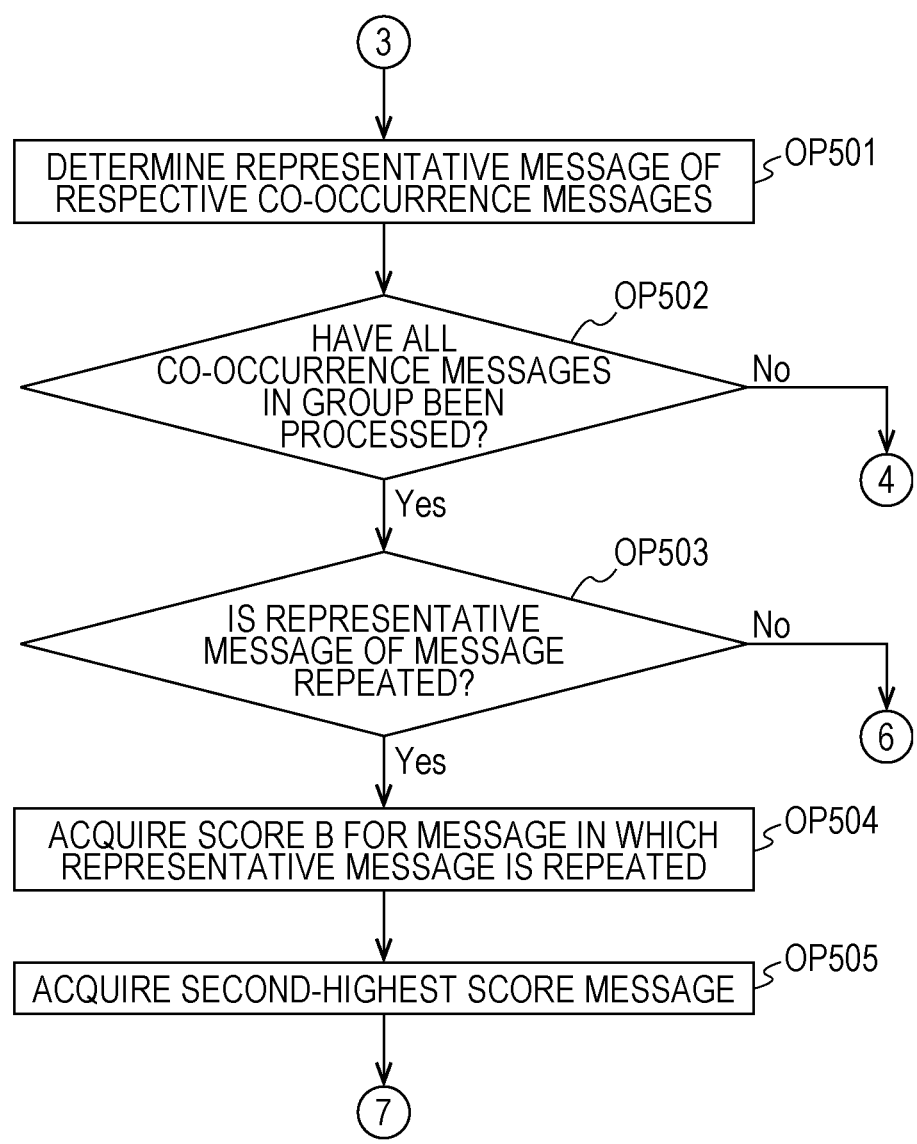
FIG. 14 is a flowchart illustrating a process performed in OP107 by the management server according to a modification example.
Figure 15:
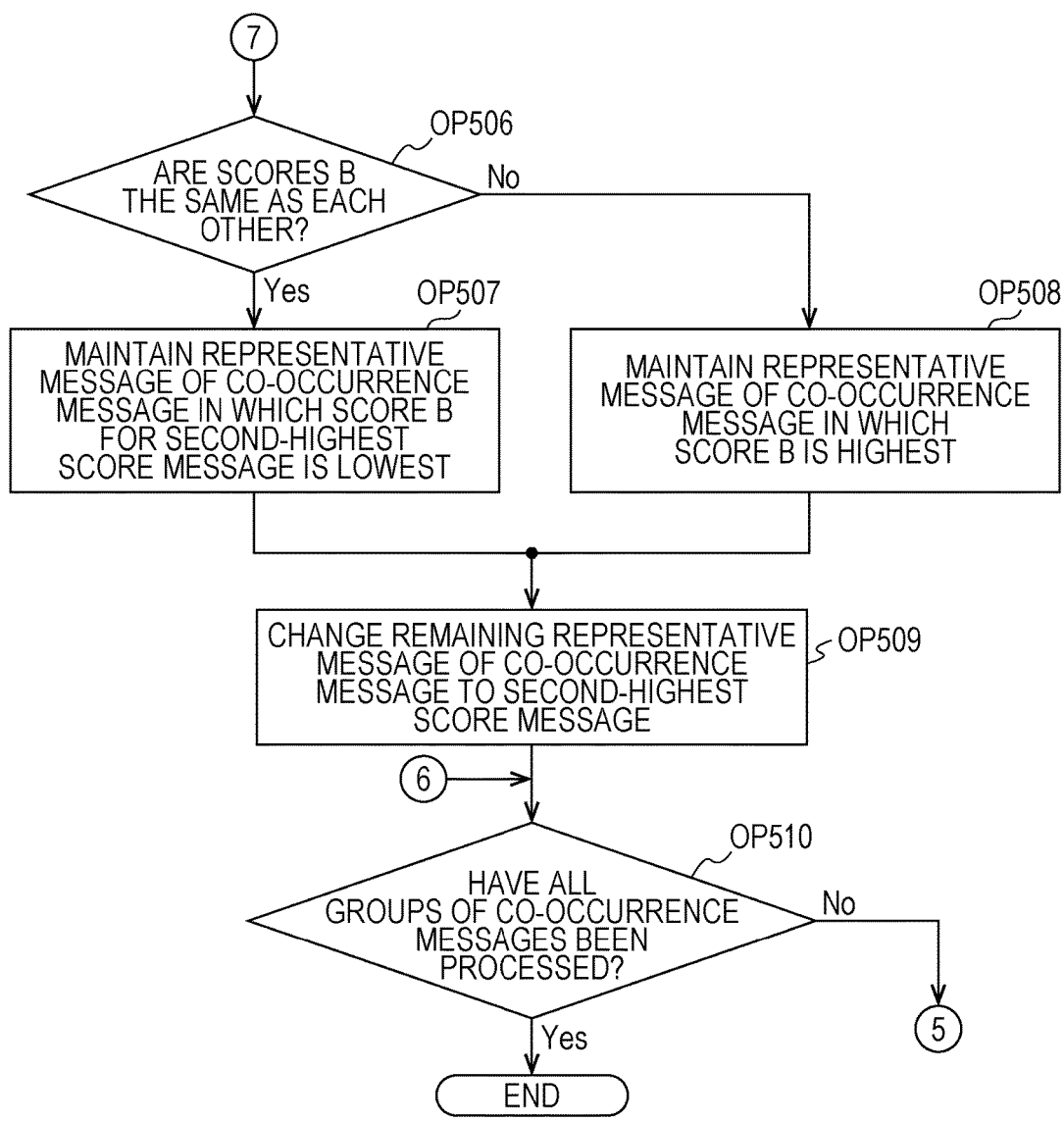
FIG. 15 is a flowchart illustrating a process performed subsequently to the process in FIG. 14 by the management server according to the modification example.

With reference to FIGS. 14 to 16, Modification Example 2 of the embodiment will be described. In the present modification example, the CPU 11 performs processes in FIGS. 14 and 15 instead of the process in FIG. 10. In the present modification example, a case is assumed in which representative messages are repeated between co-occurrence message bunches. In this case, in the process in OP108, the same representative message is created for another co-occurrence message bunch. Therefore, in the present modification example, the CPU 11 performs a process of determining a representative message such that representative messages are not repeated between co-occurrence message bunches. Processes in OP501 and OP502 are the same as the processes in OP314 and OP315 in FIG. 10.

In OP503, the CPU 11 determines whether or not there are representative messages repeated between co-occurrence message bunches among the representative messages of the respective co-occurrence message bunches determined in OP501. In a case where there are representative messages repeated between co-occurrence message bunches (OP503: Yes), the CPU 11 causes the process to proceed to OP504. In a case where representative messages repeated between co-occurrence message bunches are not present, the CPU 11 causes the process to proceed to OP511.

In OP504, the CPU 11 acquires, from the HDD 13, the score B for the representative message calculated in OP312 with respect to the co-occurrence message bunches of which the representative messages are repeated. Next, in OP505, the CPU 11 acquires a second-highest score message for which the score B is second highest after the representative message among messages of the co-occurrence message bunches of which the representative messages are repeated, and the score B for the second-highest score message. A message acquired in OP505 is referred to as a second-highest score message relative to a representative message. In a case where the second-highest score message and the score B for the second-highest score message are acquired in OP505, the CPU 11 causes the process to proceed to OP506.

In OP506, the CPU 11 determines whether or not there are the scores B having the same value among the scores B for the representative messages acquired in OP504. In a case where there are the scores B having the same value for the representative messages (OP506: Yes), the CPU 11 causes the process to proceed to OP507. On the other hand, in a case where the scores B having the same value are not present (OP506: No), the CPU 11 causes the process to proceed to OP508.

In OP507, the CPU 11 compares the scores B for the second-highest score messages acquired in OP505 between co-occurrence message bunches including the representative messages having the same scores. The CPU 11 maintains the representative message having the same score as a representative message with respect to a co-occurrence message bunch including the second-highest score message having the lowest score B. In OP509, the CPU 11 determines the second-highest score message as a representative message with respect to a co-occurrence message bunch including the remaining representative messages of the repeated representative messages. Consequently, in a case where representative messages are repeated among a plurality of co-occurrence message bunches of each group, and scores used to determine repeated messages are the same as each other, the CPU 11 specifies scores next highest to the score in each of the plurality of co-occurrence message bunches, and changes a representative message of a co-occurrence message bunch including a message for which the specified score is higher to the message for which the specified score is higher.

Here, with reference to FIGS. 16A and 16B, a description will be made of an example of the process in OP507. In FIGS. 16A and 16B, a case is assumed in which representative messages of the co-occurrence message bunches are repeated between the co-occurrence message bunch 102 and the co-occurrence message bunch 103 of the group 100 of the similar co-occurrence message bunches. In other words, a representative message of both of the co-occurrence message bunch 102 and the co-occurrence message bunch 103 is a message having the ID "M0011". FIG. 16A illustrates the score B (in the figure, a "score" field) for each message (in the figure, an "ID" field) of the co-occurrence message bunch 102. FIG. 16B illustrates the score B (in the figure, a "score" field) for each message (in the figure, an "ID" field) of the co-occurrence message bunch 103. In FIGS. 16A and 16B, a representative message of the group 100 of the similar co-occurrence message bunches is indicated by "[1]", representative messages of the co-occurrence message bunches 102 and 103 are indicated by "[2]", and second-highest score messages of the co-occurrence message bunches 102 and 103 are indicated by "[3]".

As illustrated in FIGS. 16A and 16B, the score B for the representative message "M0011" is "0.86" and is the same between the co-occurrence message bunches 102 and 103. A second-highest score message in the co-occurrence message bunch 102 is a message having the ID "M0009" for which the score B is "0.83". A second-highest score message in the co-occurrence message bunch 103 is a message having the ID "M0003" for which the score B is "0.79". The score B for the second-highest score message in the co-occurrence message bunch 102 is higher than the score B for the second-highest score message in the co-occurrence message bunch 103. Therefore, in the present modification example, the message having the ID "M0009" is determined as a representative message of the co-occurrence message bunch 102, and the message having the ID "M0011" is determined as a representative message of the co-occurrence message bunch 103. The message having the ID "M0009" changed from the message having the ID "M0011" as a representative message of the co-occurrence message bunch 102 is an example of a third message.

On the other hand, in OP508, the CPU 11 maintains a representative message of a co-occurrence message bunch including a representative message having the highest score B among repeated representative messages as the representative message. In OP509, the CPU 11 determines the second-highest score message as a representative message with respect to a remaining representative message among the repeated representative messages. As mentioned above, the CPU 11 changes a representative message of a co-occurrence message bunch other than a co-occurrence message bunch including a representative message having the highest score B to another message in the co-occurrence message bunch. Consequently, in a case where representative messages are repeated among a plurality of co-occurrence message bunches of each group, the CPU 11 changes a message having a lower score among the representative messages to another message in the co-occurrence message bunch.

Here, with reference to FIGS. 16C and 16D, a description will be made of an example of the process in OP508. In FIGS. 16C and 16D, a case is assumed in which representative messages of the co-occurrence message bunches are repeated between the co-occurrence message bunch 102 and the co-occurrence message bunch 103 of the group 100 of the similar co-occurrence message bunches. In other words, a representative message of both of the co-occurrence message bunch 102 and the co-occurrence message bunch 103 is a message having the ID "M0011". FIG. 16C illustrates the score B (in the figure, a "score" field) for each message (in the figure, an "ID" field) of the co-occurrence message bunch 102. FIG. 16D illustrates the score B (in the figure, a "score" field) for each message (in the figure, an "ID" field) of the co-occurrence message bunch 103. In FIGS. 16C and 16D, a representative message of the group 100 of the similar co-occurrence message bunches is indicated by "[1]", representative messages of the co-occurrence message bunches 102 and 103 are indicated by "[2]", and second-highest score messages of the co-occurrence message bunches 102 and 103 are indicated by "[3]".

As illustrated in FIGS. 16C and 16D, the score B for the representative message "M0011" is "0.86" in the co-occurrence message bunch 102, and is "0.88" in the co-occurrence message bunch 103, between the co-occurrence message bunches 102 and 103. In other words, the score B for the representative message of the co-occurrence message bunch 102 is lower than the score B for the representative message of the co-occurrence message bunch 103. Therefore, the CPU 11 determines the message having the ID "M0011" as a representative message of the co-occurrence message bunch 103. The CPU 11 determines the message (score B: 0.83) having the ID "M0009" which is a second-highest score message as a representative message of the co-occurrence message bunch 102.

The magnitude of the score B can be said to have a relationship with the degree of relevance to the content of a co-occurrence message bunch. Therefore, the score B for a message determined as a representative message is preferably as high as possible. According to the processes in OP507 and OP508 in the present modification example, even in a case where representative messages are repeated among co-occurrence message bunches, another representative message can be determined without lowering the score B if at all possible. Therefore, even in a case where the scores B for representative messages are the same as each other, a representative message is changed according to the score B for a second-highest score message, and thus representative messages may not be repeated among co-occurrence message bunches.

In a case where the process in OP509 is completed, the CPU 11 causes the process to proceed to OP510. A process in OP510 is the same as the process in OP316.

Modification Example 3

Figure 17:
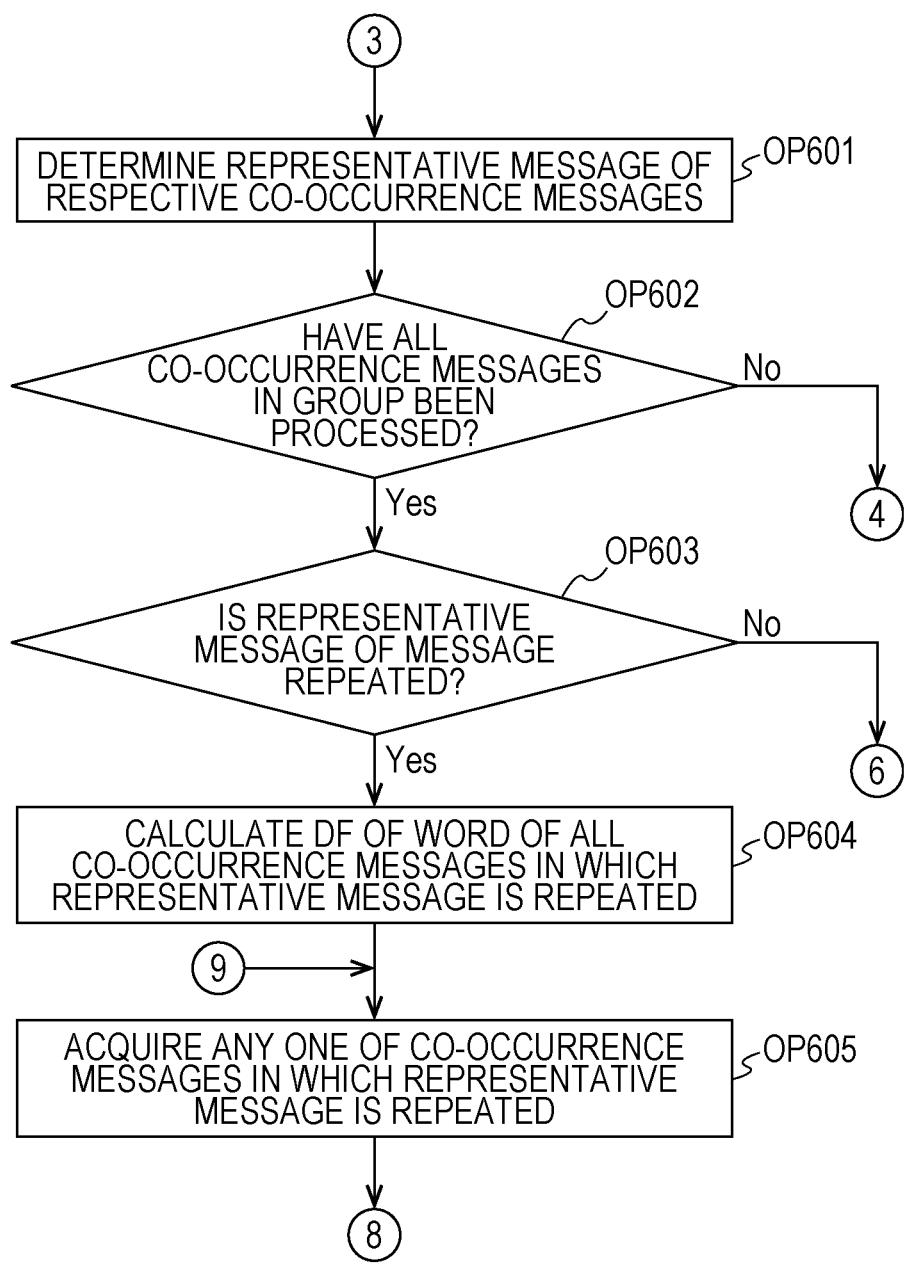
FIG. 17 is a flowchart illustrating a process performed in OP107 by the management server according to another modification example.
Figure 18:
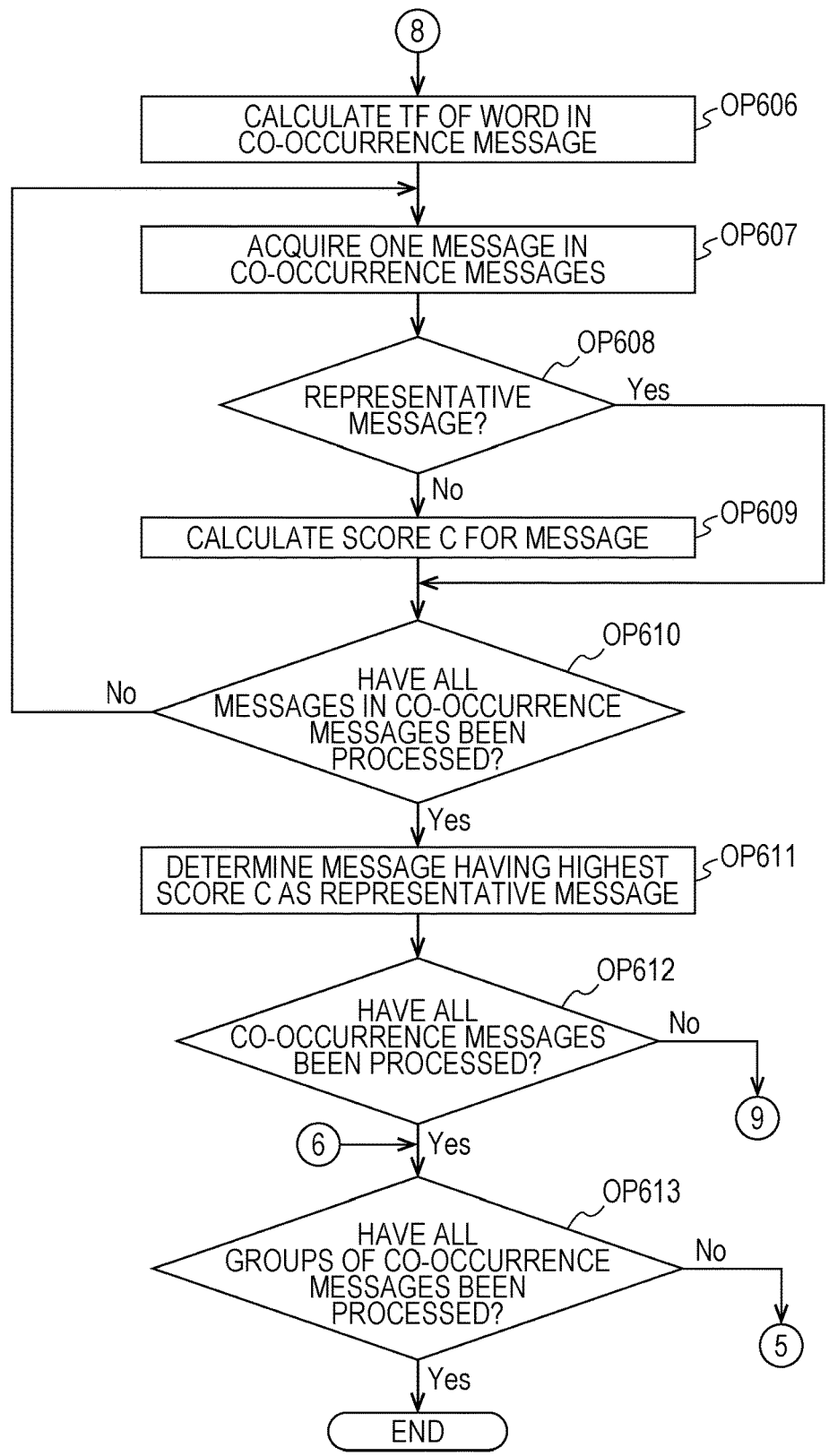
FIG. 18 is a flowchart illustrating a process performed subsequently to the process in FIG. 17 by the management server according to the modification example.

With reference to FIGS. 17 to 19, Modification Example 3 of the embodiment will be described. In the present modification example, the CPU 11 performs processes in FIGS. 17 and 18 instead of the process in FIG. 10. In the present modification example, a case is assumed in which representative messages are repeated between co-occurrence message bunches. In this case, in the process in OP108, the same representative message is created for another co-occurrence message bunch. Therefore, in the present modification example, the CPU 11 performs a process of determining a representative message such that representative messages are not repeated between co-occurrence message bunches according to a method which is different from the method in Modification Example 1. Processes in OP601 and OP602 are the same as the processes in OP314 and OP315 in FIG. 10.

In OP603, the CPU 11 determines whether or not there are representative messages repeated between co-occurrence message bunches among the representative messages of the respective co-occurrence message bunches determined in OP601. In a case where there are representative messages repeated between co-occurrence message bunches (OP603: Yes), the CPU 11 causes the process to proceed to OP604. In a case where representative messages repeated between co-occurrence message bunches are not present, the CPU 11 causes the process to proceed to OP613.

In OP604, the CPU 11 calculates DF of each word included in the respective co-occurrence message bunches of which the representative messages are repeated. The CPU 11 stores the calculated DF of each word in the HDD 13, and causes the process to proceed to OP605. In OP605, the CPU 11 acquires any one of the co-occurrence message bunches of which the representative messages are repeated. Next, the CPU 11 causes the process to proceed to OP606.

In OP606, the CPU 11 calculates TF of each word included in the co-occurrence message bunch acquired in OP605. The CPU 11 stores the calculated TF of each word in the HDD 13, and causes the process to proceed to OP607. In OP607, the CPU 11 acquires a single message in the co-occurrence message bunch acquired in OP605. Next, the CPU 11 determines whether or not the acquired message is a representative message of a group of similar co-occurrence message bunches including the co-occurrence message bunch, and is a representative message of a co-occurrence message bunch in the group of the similar co-occurrence message bunches. In a case where the acquired message is a representative message of a group of similar co-occurrence message bunches, or is a representative message of a co-occurrence message bunch in the group (OP608: Yes), the CPU 11 causes the process to proceed to OP610. On the other hand, in a case where the acquired message is not either of the representative messages (OP608: No), the CPU 11 causes the process to proceed to OP609.

In OP609, the CPU 11 calculates a score C for the message acquired in OP607. Here, the score C is a value calculated according to Equations (1) and (2) by using values of DF and TF of each word included in each message of a co-occurrence message bunch. The score C is an example of a fourth score. In calculation of the score C, in the same manner as in the score B, the score is calculated for a message included in a single co-occurrence message bunch based on a value of TF-IDF. In a case where the score C for the message acquired in OP607 is calculated, the CPU 11 causes the process to proceed to OP610.

In OP609, in a case where representative messages are repeated between a first co-occurrence message bunch and a second co-occurrence message bunch in a group, the CPU 11 calculates a score indicating relevance to a feature based on the message content of the first co-occurrence message bunch, based on the number of co-occurrence message bunches in which each word included in a message not overlapping the representative message among messages included in the first co-occurrence message bunch appears in a group including the first co-occurrence message bunch, and the number of times of appearance of each word in the first co-occurrence message bunch, and calculates a score indicating relevance to a feature based on the message content of the second co-occurrence message bunch, based on the number of co-occurrence message bunches in which each word included in a message not overlapping the representative message among messages included in the second co-occurrence message bunch appears in a group including the second co-occurrence message bunch, and the number of times of appearance of each word in the second co-occurrence message bunch.

In OP610, the CPU 11 determines whether or not the score C has been calculated for all messages in the co-occurrence message bunch acquired in OP605. In a case where the score C has been calculated for all messages in the co-occurrence message bunch acquired in OP605 (OP610: Yes), the CPU 11 causes the process to proceed to OP611. On the other hand, in a case where there is a message for which the score C has not been calculated in the co-occurrence message bunch (OP610: No), the CPU 11 returns the process to OP607. The CPU 11 performs the processes in OP607 to OP609, and calculates the score C for the message for which the score C is not calculated. Next, in OP611, the CPU 11 determines a message having the highest score C among the scores C calculated in OP609 as a representative message of the co-occurrence message bunch acquired in OP605.

FIGS. 19A to 19C illustrate calculation examples of the scores C calculated through the process in OP609. FIGS. 19A to 19C illustrate cases where the scores c are calculated for the co-occurrence message bunch 102 included in the group 100 of the similar co-occurrence message bunches illustrated in FIG. 3. In FIGS. 19A to 19C, a case is assumed in which representative messages of the co-occurrence message bunches are repeated between the co-occurrence message bunch 102 and the co-occurrence message bunch 103 of the group 100 of the similar co-occurrence message bunches. The co-occurrence message bunch 102 and the co-occurrence message bunch 103 are respective examples of a first co-occurrence message bunch and a second co-occurrence message bunch. It is assumed that a representative message of the group 100 of the similar co-occurrence message bunches is a message having the ID "M0001". It is assumed that a repeated representative message between the co-occurrence message bunch 102 and the co-occurrence message bunch 103 is a message having the ID "M0011". Thus, in the present modification example, in a case where the score C for each message is calculated, the message having the ID "M0001" and the message having the ID "M0011" are excluded.

FIGS. 19A and 19B illustrate TF (in the figure, a "TF" field) and DF (in the figure, a "DF" field) of each word included in the co-occurrence message bunch 102. FIGS. 19A and 19B illustrate whether or not each word also appears in the co-occurrence message bunch 103 (in the figure, a "co3" field). In the figure, "O" indicates that a word appears in the co-occurrence message bunch (in the figure, the co-occurrence message bunch 103), and a blank field indicates that a word does not appear in the co-occurrence message bunch. FIGS. 19A and 19B illustrate whether or not each word also appears in a group including all isolated messages (in the figure, an "all-isolated" field), and whether or not each word also appears in a group of an isolated message with a high occurrence frequency (in the figure, a "high-isolated" field). FIGS. 19A and 19B illustrate a value of TF-IDF of each word. FIG. 19C illustrates a sum (in the figure, a "TF-IDF" field) of TF-IDF calculated for each message of the co-occurrence message bunch 102 in the group 100 of the similar co-occurrence message bunches, the number of words (in the figure, a "number of words" field) included in each message, and a value of the score C (in the figure, a "score" field) calculated according to Equation (1).

In the examples illustrated in FIGS. 19A and 19B, in the same manner as in FIGS. 11A and 11B, a value of the "DF" field is a value obtained by adding the number of "O" in the respective fields including the "co3" field, the "all-isolated" field, and the "high-isolated" field to "1". As illustrated in FIG. 19C, a message having the highest score C is a message (score C: 1.00) having the ID "M0009". Therefore, in OP610, the CPU 11 determines the message having the ID "M0009" in the co-occurrence message bunch 102 as a representative message. A representative message is determined in the same manner for the co-occurrence message bunch 103.

Next, in OP612, the CPU 11 determines whether or not a message having the highest score C has been determined as a representative message with respect to all co-occurrence message bunches of which representative messages are repeated. In a case where a message having the highest score C has been determined as a representative message with respect to all co-occurrence message bunches (OP612: Yes), the CPU 11 causes the process to proceed to OP613. A process in OP613 is the same as the process in OP316. In a case where there is a co-occurrence message bunch of which a representative message has not been determined through the process among the co-occurrence message bunches of which representative messages are repeated (OP612: No), the CPU 11 returns the process to OP605.

As mentioned above, according to the present modification example, even in a case where representative messages are repeated among a plurality of co-occurrence message bunches, another representative message can be determined for each co-occurrence message bunch by using scores for respective messages other than the representative message in each co-occurrence message bunch.

In the above-described embodiment, at least some of the processes may be performed processors other than the CPU, for example, dedicated processors such as a digital signal processor (DSP), a graphics processing unit (GPU), a numerical calculation processor, a vector processor, and an image processing processor. At least some of the processes may be performed by an integrated circuit (IC) and other digital circuits. At least a part of each of the sections may include an analog circuit. The integrated circuit includes a large-scale integration (LSI), an application specific integrated circuit (ASIC), and a programmable logic device (PLD). The PLD includes, for example, a field-programmable gate array (FPGA). Each of the sections may be a combination of a processor and an integrated circuit. The combination is called, for example, a micro controller (MCU), a system-on-a-chip (SoC), a system LSI, or a chip set.

Computer Readable Recording Medium

A program which realizes a management tool, an OS, and the like for causing a computer, s machine, or an apparatus (hereinafter, referred to as a computer or the like) to perform the function of the server may be recorded on a recording medium which is readable by the computer or the like. The computer or the like reads and executes the program on the recording medium so as to provide the function.

Here, the recording medium which is readable by the computer or the like indicates a recording medium in which information such as data or a program is accumulated through electrical, magnetic, optical, mechanical, or chemical action, and can be read from the computer or the like. In such recording media, recording media detachable from the computer or the like include, for example, a flexible disk, a magnetooptical disc, a CD-ROM, a CD-R/W, a DVD, a Blu-ray disc, a DAT, an 8-mm tape, and a memory card such as a flash memory. A recording medium fixed to the computer or the like includes, for example, a hard disk or a ROM.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory, computer-readable recording medium having stored therein a program for causing a computer to execute a process, the process comprising:
    generating a plurality of co-occurrence message bunches by summarizing a plurality of messages based on a relation in which the plurality of messages output from an apparatus are mutually output within a predetermined period,
    classifying the plurality of generated co-occurrence message bunches into a plurality of groups based on similarity among the co-occurrence message bunches;
    determining a first message which is a representative of each of the plurality of groups based on an appearance characteristic of a word or a word string included in each message of each of the plurality of groups;
    determining a second message which is a representative of each of the co-occurrence message bunches and is not repeated based on an appearance characteristic of a word or a word string included in each message in each co-occurrence message bunch of each of the plurality of groups; and
    outputting, to a monitor, the first message determined for the group including each co-occurrence message bunch and the second message determined for each co-occurrence message bunch in correlation with each co-occurrence message bunch.

2. The non-transitory, computer-readable recording medium according to claim 1,
    wherein, where the first message is determined, the computer executes a process of:
    calculating a first score for indicating first relevance to a feature based on the message content of a group including each message with respect to each message of each group, based on the number of groups in which each word included in each message of the plurality of groups appears in the plurality of groups, and the number of times of appearance of each word in a group including a message including each word, and
    determining the first message based on the calculated first score.

3. The non-transitory, computer-readable recording medium according to claim 2,
    wherein, where the first score is calculated, the computer executes a process of calculating the first score such that the first relevance is reduced as the number of groups becomes larger.

4. The non-transitory, computer-readable recording medium according to claim 2,
    wherein, where the first score is calculated, the computer executes a process of calculating the first score such that the first relevance increases as the number of times of appearance becomes larger.

5. The non-transitory, computer-readable recording medium according to claim 2,
    wherein, where the first score is calculated, the computer executes a process of calculating the first score to become lower as the number of times of appearance of each word in a message not included in the co-occurrence message bunch among the plurality of collected messages becomes larger.

6. The non-transitory, computer-readable recording medium according to claim 2,
    wherein the computer classifies messages not included in the co-occurrence message bunch among the plurality of collected messages into at least one group based on the number of times of appearance of the messages, and
    wherein, where the first score is calculated, the computer executes a process of calculating the first score such that the first relevance is reduced as the number of groups becomes larger in which each word appears in the group into which messages not included in the co-occurrence message bunch are classified based on the number of times of appearance of the messages.

7. The non-transitory, computer-readable recording medium according to claim 1,
    wherein, where the second message is determined, the computer executes a process of:
    calculating a second score for indicating second relevance to a feature based on the message content of each co-occurrence message bunch with respect to each message of each co-occurrence message bunch, based on the number of co-occurrence message bunches in which each word included in each co-occurrence message bunch in the plurality of groups appears in a group including each co-occurrence message bunch, and the number of times of appearance of each word in each co-occurrence message bunch, and determining the second message based on the calculated second score.

8. The non-transitory, computer-readable recording medium according to claim 7,
wherein, where the second score is calculated, the computer executes a process of calculating the second score such that the second relevance is reduced as the number of co-occurrence message bunches becomes larger.

9. The non-transitory, computer-readable recording medium according to claim 7,
wherein, where the second score is calculated, the computer executes a process of calculating the second score such that the second relevance increases as the number of times of appearance of each word in each co-occurrence message bunch becomes larger.

10. The non-transitory, computer-readable recording medium according to claim 7,
wherein, where the second score is calculated, the computer executes a process of calculating the second score to become lower as the number of times of appearance of each word in each co-occurrence message bunch in a message not included in the co-occurrence message bunch among the plurality of collected messages becomes larger.

11. The non-transitory, computer-readable recording medium according to claim 7,
wherein the computer classifies messages not included in the co-occurrence message bunch among the plurality of collected messages into at least one group based on the number of times of appearance of the messages, and
wherein, where the second score is calculated, the computer executes a process of calculating the second score such that the second relevance is reduced as the number of groups becomes larger in which each word appears in the group into which messages not included in the co-occurrence message bunch are classified based on the number of times of appearance of the messages.

12. The non-transitory, computer-readable recording medium according to claim 7, further causing the computer to execute a process of changing a message for which the second score is lower among the second messages for overlapping each other in a plurality of co-occurrence message bunches of each group, to another message of a co-occurrence message bunch including the second message.

13. The non-transitory, computer-readable recording medium according to claim 7, further causing the computer to execute a process of:
specifying scores next highest to the second score in each co-occurrence message bunch among a plurality of co-occurrence message bunches where the second messages overlap each other in the plurality of co-occurrence message bunches of each group, and the second scores used to determine the overlapping second messages are the same as each other, and
changing the second message of a co-occurrence message bunch including a third message having a higher score of the specified scores to the third message.

14. The non-transitory, computer-readable recording medium according to claim 7, further causing the computer to execute a process of:
calculating a third score for indicating relevance to a feature based on the message content of a first co-occurrence message bunch, based on the number of co-occurrence message bunches in which each word included in a message not overlapping the first message and the second message among messages included in the first co-occurrence message bunch appears in a group including the first co-occurrence message bunch, and the number of times of appearance of each word in the first co-occurrence message bunch, where the second messages overlap each other in the first co-occurrence message bunch and a second co-occurrence message bunch of the group;
calculating a fourth score for indicating relevance to a feature based on the message content of the second co-occurrence message bunch, based on the number of co-occurrence message bunches in which each word included in a message not overlapping the first message and the second message among messages included in the second co-occurrence message bunch appears in a group including the second co-occurrence message bunch, and the number of times of appearance of each word in the second co-occurrence message bunch; and
determining a representative message of the first co-occurrence message bunch and a representative message of the second co-occurrence message bunch based on the calculated third score and fourth score.

15. An information processing apparatus comprising:
a memory; and
a processor coupled to the memory and the processor configured to:
generate a plurality of co-occurrence message bunches by summarizing a plurality of messages based on a relation in which the plurality of messages output from an apparatus are mutually output within a predetermined period;
classify the plurality of generated co-occurrence message bunches into a plurality of groups based on similarity among the co-occurrence message bunches;
determine a first message which is a representative of each of the plurality of groups based on an appearance characteristic of a word or a word string included in each message of each of the plurality of groups;
determine a second message which is a representative of each of the co-occurrence message bunches and is not repeated based on an appearance characteristic of a word or a word string included in each message in each co-occurrence message bunch of each of the plurality of groups; and
output, to a monitor, the first message determined for the group including each co-occurrence message bunch and the second message determined for each co-occurrence message bunch in correlation with each co-occurrence message bunch.

16. The information processing apparatus according to claim 15,
wherein, where the first message is determined, the processor executes processes of calculating a first score for indicating first relevance to a feature based on the message content of a group including each message with respect to each message of each group, based on the number of groups in which each word included in each message of the plurality of groups appears in the plurality of groups, and the number of times of appearance of each word in a group including a message including each word, and determining the first message based on the calculated first score.

17. The information processing apparatus according to claim 16,
wherein, where the first score is calculated, the processor executes a process of calculating the first score such that the first relevance is reduced as the number of groups becomes larger.

18. The information processing apparatus according to claim 16,
  wherein, where the first score is calculated, the processor is configured to calculate the first score such that the first relevance increases as the number of times of appearance becomes larger.

19. The information processing apparatus according to claim 16,
  wherein, where the first score is calculated, the processor is configured to calculate the first score to become lower as the number of times of appearance of each word in a message not included in the co-occurrence message bunch among the plurality of collected messages becomes larger.

20. A control method of an information processing apparatus including a processor, comprising;
  generating a plurality of co-occurrence message bunches by summarizing a plurality of messages based on a relation in which the plurality of messages output from an apparatus are mutually output within a predetermined period,
  classifying the plurality of generated co-occurrence message bunches into a plurality of groups based on similarity among the co-occurrence message bunches;
  determining a first message which is a representative of each of the plurality of groups based on an appearance characteristic of a word or a word string included in each message of each of the plurality of groups;
  determining a second message which is a representative of each of the co-occurrence message bunches and is not repeated based on an appearance characteristic of a word or a word string included in each message in each co-occurrence message bunch of each of the plurality of groups; and
  outputting, to a monitor, the first message determined for the group including each co-occurrence message bunch and the second message determined for each co-occurrence message bunch in correlation with each co-occurrence message bunch.

* * * * *